United States Patent
Ito et al.

(10) Patent No.: US 7,511,785 B2
(45) Date of Patent: Mar. 31, 2009

(54) LIQUID CRYSTAL DISPLAY HAVING LIQUID CRYSTAL CELL OF BEND ALIGNMENT MODE OR HYBRID ALIGNMENT MODE

(75) Inventors: Yoji Ito, Kanagawa (JP); Ryota Matsubara, Kanagawa (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 0 days.

(21) Appl. No.: 10/520,732

(22) PCT Filed: Oct. 28, 2004

(86) PCT No.: PCT/JP2004/016021

§ 371 (c)(1),
(2), (4) Date: Dec. 7, 2005

(87) PCT Pub. No.: WO2005/040903

PCT Pub. Date: May 6, 2005

(65) Prior Publication Data
US 2006/0114385 A1    Jun. 1, 2006

(30) Foreign Application Priority Data

| Oct. 29, 2003 | (JP) | ............................. 2003-369298 |
| Dec. 5, 2003 | (JP) | ............................. 2003-407547 |
| Dec. 17, 2003 | (JP) | ............................. 2003-419074 |

(51) Int. Cl.
*G02F 1/1335* (2006.01)
(52) U.S. Cl. .................. 349/117; 349/118; 349/119
(58) Field of Classification Search ................. 349/117, 349/119, 136
See application file for complete search history.

(56) References Cited

U.S. PATENT DOCUMENTS 6,034,755 A * 3/2000 Watanabe .................... 349/118

(Continued)

FOREIGN PATENT DOCUMENTS

JP 60-27824 2/1985

(Continued)

OTHER PUBLICATIONS

International Search Report dated Jan. 13, 2005.

*Primary Examiner*—Andrew Schechter
*Assistant Examiner*—Nathanael R Briggs
(74) *Attorney, Agent, or Firm*—Buchanan Ingersoll & Rooney PC

(57) ABSTRACT

A liquid crystal cell of bend alignment mode or hybrid alignment mode should be optically compensated suitably enough to display an image of high contrast. In the displayed image, change of hue is little, and no inversion of gradation is observed. In a liquid crystal display having a liquid crystal cell of bend alignment mode and a pair of polarizing plates, one of the polarizing plates comprises a polarizing membrane and two optically anisotropic layers. A first optically anisotropic layer is made from discotic compounds oriented in hybrid alignment, and is placed so that a direction giving the maximum refractive index in plane may be essentially at 45° to a transmission axis in plane of the polarizing membrane. The second optically anisotropic layer consists of a cellulose ester film, and is placed so that a direction giving the maximum refractive index in plane may be essentially parallel or perpendicular to a transmission axis in plane of the polarizing membrane. The liquid crystal cell of bend alignment mode and the first and second optically anisotropic layers have appropriate optical characters measured at any wavelength of 450 nm, 550 nm and 630 nm. Similar optical characters are also effective in a liquid crystal cell of hybrid alignment mode.

16 Claims, 7 Drawing Sheets

U.S. PATENT DOCUMENTS

| | | | |
|---|---|---|---|
| 6,064,457 A * | 5/2000 | Aminaka | 349/117 |
| 6,380,996 B1 * | 4/2002 | Yokoyama et al. | 349/117 |
| 6,778,242 B1 * | 8/2004 | Murayama et al. | 349/117 |
| 2003/0218709 A1 * | 11/2003 | Ito et al. | 349/117 |

FOREIGN PATENT DOCUMENTS

| | | |
|---|---|---|
| JP | 2000-221008 | 8/2000 |
| JP | 2003-232922 | 8/2003 |
| JP | 2003-260715 | 9/2003 |

* cited by examiner

LIQUID CRYSTAL DISPLAY HAVING LIQUID CRYSTAL CELL OF BEND ALIGNMENT MODE OR HYBRID ALIGNMENT MODE

FIELD OF THE INVENTION

The present invention relates to a liquid crystal display comprising a liquid crystal cell of bend alignment mode or hybrid alignment mode, a polarizing plate and an optical compensatory film.

BACKGROUND OF THE INVENTION

As compared with a CRT (cathode ray tube), a liquid crystal display (LCD) has great advantages such as thin shape, light weight, low power consumption. The liquid crystal display generally comprises a liquid crystal cell and a pair of polarizing plates provided on both sides of the cell. The liquid crystal cell comprises rod-like liquid crystal molecules, a pair of substrates between which the rod-like liquid crystal molecules are provided, and an electrode layer having a function of applying a voltage to the rod-like liquid crystal molecules. Each of the substrates has an orientation layer, which has a function of aligning the rod-like liquid crystal molecules. In addition, an optical compensatory film (phase retarder) is often provided between the cell and the polarizing plate to remove undesirable color from an image displayed on the liquid crystal cell. A laminate of the polarizing plate (polarizing membrane) and the optical compensatory film serves as an elliptically polarizing plate. In some cases, the optical compensatory film has a function of enlarging a viewing angle of the liquid crystal cell. As the optical compensatory film, a stretched birefringent film has been conventionally used.

In place of the stretched birefringent film, an optical compensatory film comprising an optically anisotropic layer composed of discotic compound has been proposed (for example, in Referential Patent Publications 1 to 4). In the optically anisotropic layer, molecules of the discotic compound are aligned, and the alignment is fixed. The discotic compound generally gives large birefringence. Further, the molecules of the discotic compound can be oriented according to one of various alignment modes. Therefore, an optical compensatory film obtained from the discotic compound can have specific optical characters that cannot be given by the conventional stretched birefringent film.

A liquid crystal display having a liquid crystal cell of bend alignment mode, in which rod-like liquid crystal molecules in upper parts and ones in lower parts are essentially reversely (symmetrically) aligned, has been proposed (for example, in Referential Patent Publications 5 and 6). Since the liquid crystal molecules in upper parts and those in lower parts are symmetrically aligned, the liquid crystal cell has self-optical compensatory function. This mode is, therefore, also referred to as OCB (optically compensatory bend) mode. In addition to the self-optical compensatory function, the liquid crystal display of OCB mode has an advantage of rapid response.

If equipped with a liquid crystal cell of hybrid alignment mode, a liquid crystal display of reflection type can have the same self-optical compensatory function as the display of bend alignment mode. The hybrid alignment mode is also referred to as RAN (hybrid-alignment-nematic) mode.

The liquid crystal display of bend alignment or hybrid alignment mode has a wide viewing angle and responds rapidly, as compared with popular displays (of TN and STN modes). Nevertheless, in consideration of images given by CRT displays, it is still necessary to improve the display of bend alignment or hybrid alignment mode. In the display of bend alignment or hybrid alignment mode, as well as in the popular display, an optical compensatory film can be used to improve qualities of displayed images. However, a conventional stretched birefringent film cannot fully fill the role of the optical compensatory film when used in bend alignment or hybrid alignment mode. As described above, it has been proposed to use an optical compensatory film comprising a transparent support and an optically anisotropic layer of discotic compound in place of the stretched birefringent film. Further, a liquid crystal display of bend alignment mode equipped with an optical compensatory film containing discotic liquid crystal compound is also proposed (for example, in Referential Patent Publications 7 and 8). The optical compensatory film containing discotic liquid crystal compound remarkably improves the viewing angle of liquid crystal display of bend alignment mode.

However, it is reported (for example, in Referential Patent Publication 9) that images given by the liquid crystal display of bend alignment mode equipped with the optical compensatory film containing discotic liquid crystal compound are often colored with leaked light of a specific wavelength. According to the publication, this undesired coloring is due to wavelength dependence of the transmittance of the elliptically polarizing plate (i.e., laminate of the polarizing membrane and the optical compensatory film). It is also reported that, if the optically anisotropic layer and the polarizing membrane are placed so that an average of directions obtained by projecting normal lines of discotic planes of the discotic compound molecules onto the anisotropic layer may be essentially at 45° to the transmission axis in the plane of the polarizing membrane, the liquid crystal cell of bend alignment mode is maximally optically compensated.

In order to reduce change of hue and to prevent inversion of gradation, various methods are proposed (for example, in Referential Patent Publications 10 and 11) for the liquid crystal cell of bend alignment mode equipped with the optical compensatory film containing discotic liquid crystal compound.

Referential Patent Publication 1: Japanese Patent Provisional Publication No. 6(1994)-214116

Referential Patent Publication 2: U.S. Pat. No. 5,583,679

Referential Patent Publication 3: U.S. Pat. No. 5,646,703

Referential Patent Publication 4: German Patent Publication No. 3,911,620 A1

Referential Patent Publication 5: U.S. Pat. No. 4,583,825

Referential Patent Publication 6: U.S. Pat. No. 5,410,422

Referential Patent Publication 7: Japanese Patent Provisional Publication No. 9(1997)-197397

Referential Patent Publication 8: International Publication No. 96/37804

Referential Patent Publication 9: Japanese Patent Provisional Publication No. 11(1999)-316378

Referential Patent Publication 10: Japanese Patent No. 3,056,997

Referential Patent Publication 11: Japanese Patent Provisional Publication No.2002-40429

DISCLOSURE OF THE INVENTION

[Problem to be Solved by the Invention]

Even if an optical compensatory film containing discotic liquid crystal compound is used, it is still difficult to prevent the inversion of gradation, and at the same to improve the viewing angle character and the contrast character of liquid crystal display of bend alignment mode or hybrid alignment mode.

An object of the present invention is to optically compensate a liquid crystal cell of bend alignment mode or hybrid alignment mode so properly that an image of high contrast can be obtained without causing change of hue and inversion of gradation.

Another object of the invention is to provide an easy process for testing whether an optical compensatory film used in a liquid crystal display has proper optical characters or not.

A further object of the invention is to provide an apparatus for testing an optical compensatory film.

[Means to Solve the Problem]

The objects of the present invention are achieved by the liquid crystal displays [1] to [14], the methods for testing an optical compensatory film [15] and [16], and the apparatuses for testing an optical compensatory film [17] and [18], described below.

[1] A liquid crystal display having a liquid crystal cell of bend alignment mode and a pair of polarizing plates provided on both sides of the cell, wherein at least one of the polarizing plates comprises a polarizing membrane and an optical compensatory film positioned nearer to the liquid crystal cell than the polarizing membrane, said optical compensatory film having at least two optically anisotropic layers comprising first and second optically anisotropic layers, said first optically anisotropic layer being made from discotic compounds oriented in hybrid alignment, said second optically anisotropic layer consisting of a cellulose ester film, and said polarizing membrane and said first and second optically anisotropic layers being so placed that the first optically anisotropic layer giving in plane the maximum refractive index in a direction of essentially 45° to a transmission axis in plane of the polarizing membrane, and that the second optically anisotropic layer gives in plane the maximum refractive index in a direction essentially parallel or perpendicular to a transmission axis in plane of the polarizing membrane, and wherein the liquid crystal cell of bend alignment mode and the first and second optically anisotropic layers have optical characters satisfying the following formula (1) when measured at any wavelength of 450 nm, 550 nm and 630 nm:

$$0.05 < (\Delta n \times d)/(Re1 \times Rth2) < 0.20 \quad (1)$$

in which $\Delta n$ is an inherent birefringent index of rod-like liquid crystal molecules in the liquid crystal cell; d is a thickness of a liquid crystal layer in the liquid crystal cell in terms of nm; Re1 is a retardation value in plane of the first optically anisotropic layer; and Rth2 is a retardation value along a thickness direction of the second optically anisotropic layer.

[2] The liquid crystal display as defined in [1], wherein the $\Delta n \times d$ satisfies the following formula (2) when measured at any wavelength of 450 nm, 550 nm and 630 nm:

$$100 \text{ nm} < \Delta n \times d < 1,500 \text{ nm}. \quad (2)$$

[3] The liquid crystal display as defined in [1], wherein the Re1 satisfies the following formula (3) when measured at any wavelength of 450 nm, 550 nm and 630 nm:

$$10 \text{ nm} < Re1 < 50 \text{ nm}. \quad (3)$$

[4] The liquid crystal display as defined in [1], wherein the Rth2 satisfies the following formula (4) when measured at any wavelength of 450 nm, 550 nm and 630 nm:

$$70 \text{ nm} < Rth2 < 400 \text{ nm}. \quad (4)$$

[5] The liquid crystal display as defined in [1], wherein the optical compensatory film gives retardation values Re(0°), Re(40°) and Re(−40°) at 546 nm in the ranges of 30±10 nm, 50±10 nm and 115±10 nm, respectively, and wherein Re(0°), Re(40°) and Re(−40°) stand for retardation values of the optical compensatory film when the retardation is measured, in a plane including the normal of the film and the direction giving in the film plane the minimum refractive index of the optical compensatory film, in the directions inclined at 0°, 40° and reversely 40° from the normal to the plane, respectively.

[6] The liquid crystal display as defined in [5], wherein the direction giving in the film plane the minimum refractive index of the optical compensatory film is essentially at 45° to a longitudinal direction when the optical compensatory film is produced.

[7] The liquid crystal display as defined [1], wherein the optical compensatory film and the polarizing membrane are laminated by attaching the film in the form of a roll to the membrane in the form of a roll.

[8] A liquid crystal display of reflection type having a reflection board, a liquid crystal cell of hybrid alignment mode and a polarizing plate in order, wherein the polarizing plate comprises a polarizing membrane and an optical compensatory film positioned nearer to the liquid crystal cell than the polarizing membrane, said optical compensatory sheet having at least two optically anisotropic layers comprising first and second optically anisotropic layers, said first optically anisotropic layer being made from discotic compounds oriented in hybrid alignment, said second optically anisotropic layer consisting of a cellulose ester film, and said polarizing membrane and said first and second optically anisotropic layers being so placed that the first optically anisotropic layer gives in plane the maximum refractive index in a direction of essentially 45° to a transmission axis in plane of the polarizing membrane, and that the second optically anisotropic layer gives in plane the maximum refractive index in a direction essentially parallel or perpendicular to a transmission axis in plane of the polarizing membrane, and wherein the liquid crystal cell of hybrid alignment mode and the first and second optically anisotropic layers have optical characters satisfying the following formula (5) when measured at any wavelength of 450 nm, 550 nm and 630 nm:

$$0.025 < (\Delta n \times d)/(Re1 \times Rth2) < 0.10 \quad (5)$$

in which $\Delta n$ is an inherent birefringent index of rod-like liquid crystal molecules in the liquid crystal cell; d is a thickness of a liquid crystal layer in the liquid crystal cell in terms of nm; Re1 is a retardation value in plane of the first optically anisotropic layer; and Rth2 is a retardation value along a thickness direction of the second optically anisotropic layer.

[9] The liquid crystal display as defined in [8], wherein the $\Delta n \times d$ satisfies the following formula (6) when measured at any wavelength of 450 nm, 550 nm and 630 nm:

$$50 \text{ nm} < \Delta n \times d < 750 \text{ nm}. \quad (6)$$

[10] The liquid crystal-display as defined in [8], wherein the Re1 satisfies the following formula (7) when measured at any wavelength of 450 nm, 550 nm and 630 nm:

$$10 \text{ nm} < Re1 < 50 \text{ nm}. \quad (7)$$

[11] The liquid crystal display as defined in [8], wherein the Rth2 satisfies the following formula (8) when measured at any wavelength of 450 nm, 550 nm and 630 nm:

$$70 \text{ nm} < Rth2 < 400 \text{ nm}. \quad (8)$$

[12] The liquid crystal display as defined in [8], wherein the optical compensatory film gives retardation values Re(0°), Re(40°) and Re(−40°) at 546 nm in the ranges of 30±10 nm, 50±10 nm and 115±10 nm, respectively, and wherein Re(0°), Re(40°) and Re(−40°) stand for retardation values of the optical compensatory film when the retardation is measured, in a plane including the normal of the film and the direction giving in the film plane the minimum refractive index of the optical compensatory film, in the directions inclined at 0°, 40° and reversely 40° from the normal to the plane, respectively.

[13] The liquid crystal display as defined in [12], wherein the direction giving in the film plane the minimum refractive index of the optical compensatory film is essentially at 45° to a longitudinal direction when the optical compensatory film is produced.

[14] The liquid crystal display as defined in [8], wherein the optical compensatory film and the polarizing membrane are laminated by attaching the film in the form of a roll to the membrane in the form of a roll.

[15] A method for testing an optical compensatory film having a transparent support and an optically anisotropic layer made from liquid crystal compounds, which comprises the steps of: placing the optical compensatory film between a pair of Glan-Thompson prisms, positioning the film and the prisms so that light-transmittance may be the least, and measuring the light-transmittance to confirm whether the value defined by the following formula is smaller than a predetermined value or not:

$$100 \times (T-C)/(P-C)$$

in which T is a light-transmittance measured where the optical compensatory film and the pair of Glan-Thompson prisms are positioned so that the light-transmittance may be the least; P is a light-transmittance measured where only the Glan-Thompson prisms are placed in parallel Nicols arrangement; and C is a light-transmittance measured where only the Glan-Thompson prisms are placed in crossed Nicols arrangement.

[16] The method as defined in [15], wherein the predetermined value is 0.005.

[17] An apparatus for testing an optical compensatory film having a transparent support and an optically anisotropic layer formed from liquid crystal compounds, which comprises a light source, a pair of Glan-Thompson prisms, a holder with which the optical compensatory film is kept and placed between the Glan-Thompson prisms, a mechanism rotating the Glan-Thompson prisms independently around the light path, and a light-receiver by which light having been emitted from the light source and passed through the optical compensatory film and the Glan-Thompson prisms is detected and evaluated.

[18] The apparatus as defined in [17], wherein the apparatus further comprises another mechanism rotating the optical compensatory film around the light path.

[Effect of the Invention]

The present inventors have studied a liquid crystal display, and found that the viewing angle is enlarged but the inversion of gradation is liable to occur as the value (ratio) of (Δn×d)/(Re1×Rth2) increases while the inversion of gradation scarcely occurs but the viewing angle is narrowed as the value of (Δn×d)/(Re1×Rth2) decreases. On the basis of this fact, the liquid crystal cell of bend alignment mode or hybrid alignment mode can be optically compensated appropriately by optically designing the value of (Δn×d)/Re1, which can be regarded as a parameter indicating the alignment of liquid crystal molecules in displaying a full black image, and the value of Rth2, which indicates an optical character of the second optically anisotropic layer in a particular range.

If the optical compensatory film (comprising the first and second optically anisotropic layers) is made of some specific materials, the value of (Δn×d)/(Re1×Rth2) often varies in accordance with the wavelength at which the retardation is measured. In the present invention, however, the value of (Δn×d)/(Re1×Rth2) is controlled in the optimum range, namely in the above range of (1) or (5), at any wavelength of 450 nm, 550 nm and 630 nm so that the liquid crystal cell of bend or hybrid alignment mode can be optically compensated properly in the whole visible wavelength region.

The inventors have further studied, and found that only one cellulose ester film can serve as the second optically anisotropic layer satisfying the above condition. The cellulose ester film also works as a support on which the first optically anisotropic layer (comprising discotic molecules oriented in hybrid alignment) is provided. Accordingly, if the second optically anisotropic layer is a cellulose ester film, it is possible to produce an optical compensatory film having conventional elements (i.e., a cellulose ester film and a layer comprising discotic molecules oriented in hybrid alignment) but satisfying the above condition of (1) or (5).

A liquid crystal display of birefringent mode such as bend alignment mode or hybrid alignment mode has a liquid crystal cell in which liquid crystal molecules are aligned very complexly, and hence an optical compensatory film optimally compensating the viewing angle cannot be schematically represented by a conventional refractive ellipsoid.

The present inventors have found a relation between retardation values of the optical compensatory film measured at various angles and the contrast-viewing angle of liquid crystal display. It is also found that the contrast-viewing angle of liquid crystal display closely relates to retardation values of the optical compensatory film measured, in a plane including the normal of the film and the direction giving in the film plane the minimum refractive index of the optical compensatory film, in the directions inclined at 0°, 40° and reversely 40° from the normal to the plane. The plane including the normal of the optical compensatory film and the direction giving in the film plane the minimum refractive index of the optical compensatory film generally corresponds to a plane including the normal and a direction inclined at 45° from the longitudinal direction of rolled belt-shaped compensatory film (in producing the film) to a direction giving a smaller refractive index in the film plane.

It is further found that, in order to improve the viewing angle of liquid crystal display of bend alignment mode or hybrid alignment mode, the retardation values Re(0°), Re(40°) and Re(−40°) measured at 546 nm by means of KOBRA21ADH (OJI SCIENTIFIC INSTRUMENTS CO., LTD.) are preferably in the ranges of 30±10 nm, 50±10 nm and 115±10 nm, respectively. As described above, Re(0°), Re(40°) and Re(−40°) stand for retardation values of the optical compensatory film when the retardation is measured in the directions inclined at 0°, 40° and reversely 40° from the normal to the plane giving the minimum refractive index, respectively. In place of KOBRA21ADH, an ellipsometer (M-150, JASCO COORPORATION) may be used. The ellipsometer gives essentially the same results as KOBRA21ADH.

EMBODIMENTS OF THE INVENTION

[Liquid Crystal Display and Polarizing Plate]

FIG. 1 is a sectional view schematically illustrating alignment of liquid crystal molecules in a liquid crystal cell of bend alignment mode. As shown in FIG. 1, a bend alignment liquid crystal cell comprises an upper substrate (14a), a lower substrate (14b) and a liquid crystal compound (11) sealed between the substrates. The liquid crystal compound (11) used in a liquid crystal cell of bend alignment generally has a positive dielectric constant anisotropy. Each of the upper substrate (14a) and the lower substrate (14b) has an orientation layer (12a, 12b) and an electrode layer (13a, 13b). The orientation layer has a function of aligning the rod-like liquid crystal molecules (11a to 11j). The arrow RD in FIG. 1 indicates the rubbing direction of the orientation layer. The electrode has a function of applying voltage to the rod-like liquid crystal molecules (11a to 11j).

As shown in (off) of FIG. 1, the rod-like liquid crystal molecules (11a to 11e) near the upper substrate (14a) are aligned reversely (symmetrically) to those (11f to 11j) near the lower substrate (14b) when low voltage is applied. On the other hand, the molecules (11a, 11b, 11i, 11j) neighboring the substrates (14a, 14b) are almost horizontally aligned while those (11d to 11g) centered in the cell are almost vertically aligned.

As shown in (on) of FIG. 1, the rod-like liquid crystal molecules (11a, 11j) neighboring the substrates (14a, 14b) are still almost horizontally aligned when high voltage is applied. The molecules (11e, 11f) centered in the cell are also still almost vertically aligned. The alignment of the other liquid crystal molecules (11b, 11c, 11d, 11g, 11h, 11i) is changed when the applied voltage is increased. These molecules are rather vertically aligned compared with the alignment of the off state. However, the molecules (11a to 11e) near the upper substrate (14a) are aligned still reversely (symmetrically) to those (11f to 11j) near the lower substrate (14b) even if high voltage is applied.

FIG. 2 schematically illustrates a polarizing plate. The polarizing plate shown in FIG. 2 comprises a laminate of a first optically anisotropic layer (31) containing discotic molecules (31a to 31e), a second optically anisotropic layer (33) having at least one cellulose ester film and a polarizing membrane (34). The polarizing plate shown in FIG. 2 further comprises an orientation layer (32) between the first optically anisotropic layer (31) and the second optically anisotropic layer (33). The discotic molecules (31a to 31e) contained in the optically anisotropic layer (31) are planer molecules, and each molecule has only one plane, namely discotic plane. The discotic plane is inclined to the plane of the second optically anisotropic layer (33). The inclined angle between each discotic plane and the plane of second optically anisotropic layer increases according as the distance between the molecule and the orientation layer (32) increases. The average inclined angle is preferably in the range of 15° to 50°. If the inclined angle is controlled to vary as illustrated in FIG. 2, the polarizing plate remarkably enlarges the viewing angle. Such polarizing plate has another function of preventing displayed image from reversion, gray-scale inversion and color contamination. The average of directions (PL) obtained by projecting normal lines (NL) of discotic planes of the discotic molecules (31a to 31e) onto the plane of second optically anisotropic layer (33) is anti-parallel to the rubbing direction (RD) of orientation layer (32).

In the present invention, the average of directions obtained by projecting normal lines of discotic planes of the discotic molecules onto the plane of second optically anisotropic layer (33) is made to be oriented essentially at 45° to the slow axis (SA) in the plane of second optically anisotropic layer. Accordingly, in producing the polarizing plate, the orientation layer (32) is rubbed in the rubbing direction (RD) at the angle (θ) of 45° to the slow axis (SA) in the plane of second anisotropic layer. In addition, the second optically anisotropic layer and the polarizing membrane (34) are so arranged that the slow axis (SA) in the plane of second anisotropic layer is essentially parallel or perpendicular to a transmission axis (TA) in the plane of polarizing membrane. In the polarizing plate shown in FIG. 2, a film of the second optically anisotropic layer is placed so that the slow axis (SA) is essentially parallel to the transmission axis (TA). The slow axis (SA) in the plane of the second optically anisotropic layer (33) normally corresponds to the stretching direction of the film of second optically anisotropic layer. The transmission axis (TA) in the plane of the polarizing membrane (34) is normally perpendicular to the stretching direction of the polarizing membrane (34).

FIG. 3 schematically illustrates a liquid crystal display of bend alignment mode according to the present invention. The liquid crystal display shown in FIG. 3 comprises a liquid crystal cell of bend alignment mode (10), a pair of polarizing plates (31A to 34A, 31B to 34B) arranged on both sides of the liquid crystal cell, and a backlight (BL). The liquid crystal cell of bend alignment mode (10) corresponds to the liquid crystal cell shown in FIG. 1. The rubbing directions (RD2, RD3) in the liquid crystal cell (10) are identical (parallel to each other). Each polarizing plate comprises a laminate of a first optically anisotropic layer (31A, 31B), a second optically anisotropic layer (33A, 33B) and a polarizing membrane (34A, 34B) in this order from the side of the liquid crystal cell (10). The rubbing directions (RD1, RD4) for the discotic molecules of the first optically anisotropic layer (31A, 31B) are anti-parallel to those (RD2, RD3) in the liquid crystal cell (10). As described above, the rubbing directions (RD1, RD4) for the discotic molecules are also anti-parallel to the average of directions obtained by projecting normal lines of discotic planes of the discotic molecules onto the plane of second optically anisotropic layer. The angle between the rubbing direction (RD1, RD4) and the slow axis (SA1, SA2) in the plane of second optically anisotropic layer (33A, 33B) is essentially 45° in the same plane. The angle between the rubbing direction (RD1, RD4) and the transmission axis (TA1, TA2) in the plane of polarizing membrane (34A, 34B) is also essentially 45° in the same plane. The polarizing membranes (34A, 34B) are so arranged the transmission axes (TA1, TA2) are perpendicular to each other (placed in crossed Nicols arrangement).

FIG. 4 schematically illustrates a relation of optical compensation in a liquid crystal display of bend alignment mode. As shown in FIG. 4, the liquid crystal cell (10) of bend alignment mode is optically compensated with cooperation between the first optically anisotropic layers (31A, 31B) and the second optically anisotropic layers (33A, 33B) in the liquid crystal display of the invention. The rubbing direction (RD1, RD4) for the discotic molecules in the optically anisotropic layer (31A, 31B) is placed anti-parallel to the rubbing direction (RD2, RD3) in the liquid crystal cell, and thereby the liquid crystal molecules in the bend alignment liquid crystal cell (10) are optically compensated by the corresponding (shown as the relations a to c and e to g) discotic molecules in the optically anisotropic layer (31A, 31B). The second optical anisotropic layers (33A, 33B) correspond (shown as the relations d and h) to the essentially vertically aligned liquid crystal molecules centered in the bend alignment liquid crystal cell (10). The ellipsoids shown in the second optically anisotropic layers (33A, 33B) indicate refractive ellipsoids caused by optical anisotropy.

FIG. 5 schematically illustrates various embodiments of the polarizing plate.

The embodiment (a1) shown in FIG. 5 corresponds to the most basic polarizing plate shown in FIG. 2. The embodiment (a1) comprises the first optically anisotropic layer (31), the second optically anisotropic layer (33) and the polarizing membrane (34) layered in this order. The angle between the rubbing direction (RD) for the discotic molecules and the slow axis (SA) of the second optically anisotropic layer (33) is essentially 45°. The slow axis (SA) of the second optically anisotropic layer (33) is essentially parallel to the transmission axis (TA) of the polarizing membrane (34).

The embodiment (a2) in FIG. 5 comprises the first optically anisotropic layer (31), the second optically anisotropic layer (33) and the polarizing membrane (34) layered in this order. The angle between the rubbing direction (RD) for the discotic molecules and the slow axis (SA) of the second optically anisotropic layer (33) is essentially 45° The slow axis (SA) of the second optically anisotropic layer (33) is essentially perpendicular to the transmission axis (TA) of the polarizing membrane (34).

The embodiment (b1) in FIG. 5 comprises the second optically anisotropic layer (33), the first optically anisotropic layer (31) and the polarizing membrane (34) layered in this order. The angle between the rubbing direction (RD) for the discotic molecules and the slow axis (SA) of the second optically anisotropic layer (33) is essentially 45°. The slow axis (SA) of the second optically anisotropic layer (33) is essentially parallel to the transmission axis (TA) of the polarizing membrane (34).

The embodiment (b2) in FIG. 5 comprises the second optically anisotropic layer (33), the first optically anisotropic layer (31) and the polarizing membrane (34) layered in this order. The angle between the rubbing direction (RD) for the discotic molecules and the slow axis (SA) of the second optically anisotropic layer (33) is essentially 45°. The slow axis (SA) of the second optically anisotropic layer (33) is essentially perpendicular to the transmission axis (TA) of the polarizing membrane (34).

The liquid crystal display of reflection type comprises a reflection board, a liquid crystal cell of hybrid alignment mode, an optical compensatory film and a polarizing plate, layered in this order. Light incident upon the side of the polarizing plate passes through the polarizing plate, the optical compensatory film and the liquid crystal cell in this order, and is then reflected by the reflection board. The reflected light comes back through the liquid crystal cell, the optical compensatory film and the polarizing plate. Since thus twice passing through the liquid crystal cell of hybrid alignment mode, light is compensated in the same way as only once passing through the liquid crystal cell of bend alignment mode. Accordingly, the liquid crystal display of reflection type has the same optical function as the display of bend alignment mode, which comprises a polarizing plate, an optical compensatory film, a liquid crystal cell of bend alignment mode, another optical compensatory film and another polarizing plate.

[Optical Characters of Optical Compensatory Film]

In the invention, the liquid crystal cell of bend alignment mode and the first and second optically anisotropic layers have optical characters satisfying the following formula (1) when measured at any wavelength of 450 nm, 550 nm and 630 nm:

$$0.05<(\Delta n \times d)/(Re1 \times Rth2)<0.20. \quad (1)$$

In the formula (1), $\Delta n$ is an inherent birefringent index of rod-like liquid crystal compound in the liquid crystal cell; d is a thickness of liquid crystal layer in the liquid crystal cell in terms of nm; Re1 is a retardation value of the first optically anisotropic layer in the plane; and Rth2 is a retardation value of the second optically anisotropic layer along the thickness.

The liquid crystal cell of hybrid alignment mode and the first and second optically anisotropic layers also have optical characters satisfying the following formula (5) when measured at any wavelength of 450 nm, 550 nm and 630 nm:

$$0.025<(\Delta n \times d)/(Re1 \times Rth2)<0.10. \quad (5)$$

In the formula (5), $\Delta n$, d, Re1 and Rth2 are the same as in the formula (1).

Details (including preferred values) of $\Delta n$, d, Re1 and Rth2 are described later. The $\Delta n$ and d, Re1, and Rth2 are explained in detail in the chapters of [Liquid crystal display], [First optically anisotropic layer] and [Second optically anisotropic layer], respectively.

The optical compensatory film preferably gives retardation values Re(0°), Re(40°) and Re(−40°) at 546 nm in the ranges of 30±10 nm, 50±10 nm and 115±10 nm, respectively. They are more preferably in the ranges of 30±5 nm, 50±5 nm and 115±5 nm, respectively.

Here, Re(0°), Re(40°) and Re(−40°) stand for retardation values of the optical compensatory film when the retardation is measured, in a plane including the normal of the film and the direction giving in the film plane the minimum refractive index of the optical compensatory film (the plane is essentially the same as the plane including the normal and a direction inclined at 45° from the longitudinal direction of compensatory film to a direction giving a smaller refractive index in the film plane), in the directions inclined at 0°, 40° and reversely 40° from the normal, respectively, to the direction inclined at about 45°.

The optical compensatory film preferably does not give the retardation value of 0 in any direction. In other words, preferably there is no optical axis in the optical compensatory film.

[Process and Apparatus for Testing the Optical Compensatory Film]

The optical compensatory film generally comprises a transparent support and an optically anisotropic layer formed from liquid crystal compound. The optically anisotropic layer has a slow axis parallel or perpendicular to the average of directions obtained by projecting molecular symmetrical axes of the liquid crystal molecules onto the plane of the support. If linearly polarized light comes into the optical compensatory film placed so that the slow axis of the transparent support may be neither parallel nor perpendicular to the slow axis of the optically anisotropic layer, the light having passed through the optical compensatory film is elliptically polarized. Therefore, the transmittance of the optical compensatory film simply placed between (a pair of) polarizers placed in crossed Nicols arrangement is not always identical with the contrast given by the optical compensatory film installed in the liquid crystal display.

The inventors have studied and found that, if the optical compensatory film and the polarizers are placed in a specific arrangement, the transmittance of the optical compensatory film relates to the contrast of the liquid crystal display equipped with the optical compensatory film.

In the optical compensatory film having an optically anisotropic layer formed from liquid crystal compound, it is thought that the alignment of liquid crystal molecules is disturbed to lower the contrast. This disturbed alignment is scarcely detected if the slow axes are neither parallel nor perpendicular to each other. That is because light having passed through the optical compensatory film is elliptically polarized even if incident light is linearly polarized.

It is found that, if the polarizer on the incident side, the optical compensatory film and the polarizer on the outward side are placed in a specific arrangement, the light having passed through the optical compensatory film is almost linearly polarized. Accordingly, the transmittance observed in that arrangement indicates the alignment of liquid crystal molecules. The more the transmittance is, the more the alignment of liquid crystal molecules is disturbed. The smaller the transmittance is, the less the alignment is disturbed.

Although the transmittance depends on the arrangement of the polarizers and the optical compensatory film, the alignment of liquid crystal molecules can be represented by the minimum transmittance. For example, in the case where the transparent support and the optically anisotropic layer in the optical compensatory film have retardation values of 40 nm and 30 nm, respectively, in the plane, and where they are placed so that their slow axes may be crossed at 45° to each other, the minimum transmittance can be observed when the transmission axis of the polarizer on the incident side, the slow axis of the transparent support, the slow axis of the optically anisotropic layer and the transmission axis of the polarizer on the outward side are placed at 90°, 20°, 155° and 182°, respectively, if those axes are seen from the outward side.

The optical compensatory film having the transparent support and the optically anisotropic layer formed from liquid crystal compound is placed between a pair of Glan-Thompson prisms. After the film and the prisms are positioned so that the transmittance may be the least, the transmittance is measured to confirm whether the value defined by the following formula is smaller than a predetermined value or not. If the transmittance is smaller than the predetermined value, the optical compensatory film can be considered to have good qualities.

$$100 \times (T-C)/(P-C)$$

In the above formula, T is a light-transmittance measured where the optical compensatory film and the Glan-Thompson prisms are positioned so that the transmittance may be the least; P is a light-transmittance measured where only the Glan-Thompson prisms are placed in parallel Nicols arrangement; and C is a light-transmittance measured where only the Glan-Thompson prisms are placed in crossed Nicols arrangement.

The above predetermined value is generally 0.005. The value of $100 \times (T-C)/(P-C)$ is preferably 0.004 or less, more preferably 0.003 or less.

If equipped with the optical compensatory film giving a low transmittance in a particular arrangement, for example, if equipped with the optical compensatory film giving the minimum transmittance of 0.005% or less when placed between the polarizers, the liquid crystal display is excellent in displaying moving images (particularly, with regard to responding speed), in the viewing angel and in the front contrast.

FIG. 6 schematically illustrates the apparatus for testing an optical compensatory film. The apparatus shown in FIG. 6 comprises a light source, a pair of Glan-Thompson prisms (polarizers), a holder with which the optical compensatory film is kept and placed between the Glan-Thompson prisms, a mechanism rotating the Glan-Thompson prisms (polarizers) independently around the light path, and a light-receiver (photo multiplier tube) by which light having been emitted from the light source and passed through the optical compensatory film and the Glan-Thompson prisms is detected and evaluated.

As shown in FIG. 6, the testing apparatus further comprises another mechanism rotating the optical compensatory film around the light path.

[Second Optically Anisotropic Layer]

In the liquid crystal display comprising the liquid crystal cell of bend alignment mode or hybrid alignment mode, the second optically anisotropic layer has a retardation value (Rth2) along the thickness preferably in the range of 70 to 400 nm, more preferably in the range of 150 to 250 nm.

A preferred range of the retardation value (Re2) in the plane of the second optically anisotropic layer depends upon the position of the transmission axis of polarizing membrane. In the case where the slow axis in the plane of the second optically anisotropic layer is essentially perpendicular to the transmission axis, Re2 is preferably in the range of 1 to 20 nm, more preferably in the range of 1 to 15 nm. If the slow axis in the plane of second optically anisotropic layer is essentially parallel to the transmission axis, Re2 is preferably in the range of 20 to 100 nm, more preferably in the range of 30 to 60 nm. The second optically anisotropic layer has a birefringent index in the plane ($\Delta n$: nx−ny) preferably in the range of 0.00025 to 0.00088. The birefringent index along the thickness ((nx+ny)/2−nz) is preferably in the range of 0.00088 to 0.005.

The second optically anisotropic layer is composed of a cellulose ester film.

The cellulose ester film preferably has a transmittance of 80% or more.

As the cellulose ester, cellulose esters of lower fatty acids are preferred. The term "lower fatty acids" means fatty acids having 6 or less carbon atoms. Cellulose esters of fatty acids having 2 to 4 carbon atoms are preferred, and ester of acetic acid (namely, cellulose acetate) is particularly preferred. Cellulose esters of mixed fatty acids such as cellulose acetatepropionate and cellulose acetatebutyrate are also usable.

The cellulose acetate has a viscosity average polymerization degree (DP) of preferably 250 or more, more preferably 290 or more. Further, it is also preferred for the cellulose acetate to have a narrow molecular weight distribution of Mw/Mn (Mw and Mn are weight and number average molecular weights, respectively) determined by gel permeation chromatography. The value of Mw/Mn is preferably in the range of 1.0 to 3, more preferably in the range of 1.0 to 1.7.

The cellulose acetate preferably has an acetic acid content of 55.0 to 62.5%. The acetic acid content is more preferably in the range of 57.0 to 62.0%. The term "acetic acid content" means the amount of combined acetic acid per one weight unit of cellulose. The acetic acid content is determined according to ASTM: D-817-91 (tests of cellulose acetate).

In a cellulose acetate, hydroxyl groups at 2-, 3- and 6-positions are not equally substituted, and the substitution degree at 6-position is apt to be relatively small. However, in the cellulose acetate used as the second optically anisotropic layer, the substitution degree at 6-position is preferably not smaller than those at 2- and 3-positions.

The substitution degree at 6-position is preferably 30% to 40%, more preferably 31% to 40%, most preferably 32% to 40%, based on the total substitution degree at 2-, 3- and 6-positions. Further, the substitution degree at 6-position is preferably 0.88 or more.

Cellulose esters and processes for synthesizing them are described in Japan institute of invention and innovation technical report No. 2001-1745. pp. 9.

In order to control the retardation of cellulose ester film, external force is generally applied (for example, to stretch the film). In addition, a retardation-increasing agent may be incorporated to control optically anisotropy. The retardation-increasing agent is preferably an aromatic compound having at least two aromatic rings. The aromatic compound is used in an amount of preferably 0.01 to 20 weight parts, based on 100 weight parts of the polymer. Two or more aromatic compounds may be used in combination. The aromatic ring in the aromatic compound may be an aromatic hydrocarbon ring or an aromatic heterocyclic ring.

The retardation-increasing agents are described in European Patent Publication No. 0,911,656, Japanese Patent Provisional Publication Nos. 2000-111914 and 2000-275434.

The cellulose ester film preferably has a moisture expansion coefficient of $30 \times 10^{-5}$/% RH or less. The moisture expansion coefficient is more preferably $15 \times 10^{-5}$/% RH or less, most preferably $10 \times 10^{-5}$/% RH or less. The moisture expansion coefficient is preferably as small as possible, but normally $1 \times 10^{-5}$/% RH or more. The moisture expansion coefficient indicates how much the film expands when relative humidity is changed at a constant temperature. The moisture expansion coefficient is controlled in order to prevent transmittance at the peripheral part of displaying screen from increasing (namely, to prevent light from framewise leaking) without impairing the optical compensating function of the film.

The moisture expansion coefficient is measured in the following manner. The cellulose ester film is cut into ten pieces of 5 mm×20 mm. One end of each piece is fixed, and a weight of 0.5 g is suspended from the other end. The hanging piece is left under the conditions of the temperature of 25° C. and the relative humidity of 20% RH($R0$) for 10 minutes, and then the length ($L0$) is measured. The humidity is then changed to 80% RH($R1$) while the temperature is kept 25° C., and the length ($L1$) is measured. From the obtained date, the moisture expansion coefficient is calculated according to the following formula. With respect to the ten pieces, the measurement is repeated and the obtained values are averaged.

Moisture expansion coefficient [/% $RH$]={($L1-L0$)/$L0$}/($R1-R0$)

For preventing the cellulose ester film from dimensional change caused by moisture, a hydrophobic compound is preferably incorporated. The hydrophobic compound may be in the form of fine particles. The hydrophobic compound is preferably selected from materials known as plasticizer and deterioration inhibitor. The hydrophobic compound preferably has a hydrocarbonyl group (aliphatic or aromatic group) as the hydrophobic group. The amount of the hydrophobic compound is preferably in the range of 0.01 to 10 wt. %, base on the amount of prepared polymer solution (dope).

It is also effective in reducing the dimensional change of cellulose ester film to decrease free volume in the film. For example, if remaining solvent used in the solvent cast method described later for forming the film is reduce, the free volume decreases. Accordingly, the film is preferably dried so that the amount of remaining solvent may be in the range of 0.01 to 1.00 wt. %.

Examples of additives for the cellulose ester film include ultraviolet absorber, releasing agent, antistatic agent, deterioration inhibitors (e.g., oxidation inhibitor, peroxide decomposer, radical inhibitor, metal inactivating agent, oxygen scavenger, amine) and infrared absorber.

If the cellulose ester film consists of plural layers, the layers may have different additives in different amounts. The additives are described in, for example, Japan institute of invention and innovation technical report No. 2001-1745. pp. 16-22. The amount of additives is generally in the range of 0.001 to 25 wt. % based on the weight of the cellulose ester film.

The cellulose ester film is preferably prepared according to a solvent cast method. In the solvent cast method, a solution (dope) in which cellulose ester is dissolved in an organic solvent is used.

The dope is cast on a drum or a band, and the solvent is evaporated to form a film. The solid content of the dope before cast is preferably controlled in the range of 18 to 35%. The surface of the drum or band is preferably beforehand polished to be a mirror.

The surface temperature of the drum or band is preferably 10° C. or below. After cast on the drum or band, the dope is blown with air for 2 seconds or more to dry. The formed film is then peeled, and further blown with hot air whose temperature is successively changed from 100° C. to 160° C. in order to evaporate remaining solvent. This procedure is described in Japanese Patent Publication No. 5(1993)-17844. That procedure can shorten the time taken to complete the steps of cooling to peeling. For performing the procedure, the cast dope must gel at the surface temperature of the drum or band.

Two or more cellulose ester solutions (dopes) can be cooperatively cast to form two or more layers. For example, two or more outlets are arranged at intervals along the running direction of the support, and from each outlet each cellulose ester solution is extruded to form a layered film (Japanese Patent Provisional Publication No. 11(1999)-198285). Otherwise, cellulose ester solutions may be cast from two outlets to form a film (Japanese Patent. Provisional Publication No. 6(1994)-134933). Further, a flow of high-viscous cellulose ester solution may be enclosed with a flow of low-viscous one to form a layered flow, and the high- and low-viscous solutions in the layered flow may be simultaneously extruded to produce a film (Japanese Patent Provisional Publication No. 56(1981)-162617).

The steps of the solvent cast-film forming process such as dissolving, casing (including cooperative casting), drying, peeling and stretching, as well as a metal support used in the procedures, are described in Japan institute of invention and innovation technical report No. 2001-1745. pp. 22-30.

The cellulose ester film has a thickness of preferably 15 to 120 μm, more preferably 30 to 80 μm.

The cellulose ester film is preferably subjected to surface treatment. Examples of the surface treatment include corona discharge treatment, glow discharge treatment, flame treatment, acid treatment, alkali treatment, and ultraviolet (UV) treatment. The surface treatment is described in Japan institute of invention and innovation technical report No. 2001-1745. pp. 30-32.

It is particularly preferred to perform the alkali treatment, in which the cellulose ester film is saponified (alkali-saponification treatment).

For the alkali-saponification treatment, the cellulose ester film may be immersed in a saponifying alkaline solution, or otherwise the cellulose ester film may be coated with the saponifying solution. The coating procedure is preferred. As the coating method, known methods such as dip-coating, curtain-coating, extrusion-coating, bar-coating and E-type coating can be adopted. The E-type coating method is particularly preferred. The alkali is preferably a hydroxide of alkali metal (e.g., potassium or sodium), and namely the alkaline solution is preferably an aqueous solution of alkali metal hydroxide. The normality of hydroxyl ion in the solution is preferably in the range of 0.1 to 3.0 N.

Solvents having good wettability to the film, surface active agents and wetting agents (e.g., diol, glycerol) may be added to the alkaline solution, to make the second optically anisotropic layer wetted well with the alkaline solution and to improve the stability of the alkaline solution. The solvents having good wettability to the film are preferably alcohols (e.g., isopropyl alcohol, butanol, methanol, ethanol). The additives for the alkaline solution are described in Japanese Patent Provisional Publication No. 2002-82226 and PCT publication No. 02/46809.

In place of or in addition to the surface treatment, an undercoating layer (disclosed in Japanese Patent Provisional Publication No. 11(1999)-248940) may be provided. Two or more undercoating layers may be provided. For example, an undercoating layer of polymer having both hydrophobic group and hydrophilic group is provided, and thereon another undercoating layer of hydrophilic polymer improving adhesion onto the orientation layer is provided (Japanese Patent Provisional Publication No. 11(1999)-248940).

[Orientation Layer]

The orientation layer has a function of controlling the orientation direction in which discotic molecules in the first optically anisotropic layer are aligned. The orientation layer is, therefore, indispensable for forming the first anisotropic layer. However, if once the discotic molecules are aligned and fixed, the orientation layer is no longer necessary. For example, if the first optically anisotropic layer in which the alignment of discotic molecules is fixed is transferred onto the second optically anisotropic layer, a liquid crystal display without the orientation layer can be produced. In spite of that, the orientation layer is normally provided between the first and second optically anisotropic layers.

The orientation layer can be formed by rubbing treatment of an organic compound (preferably a polymer), by oblique evaporation of an inorganic compound, by formation of a micro groove layer or by stimulation of an organic compound (e.g., ω-tricosanoic acid, dioctadecylmethylammonium chloride, methyl stearate) according to a Langmuir-Blodgett (LB) method. Further, the aligning function of the orientation layer can be activated by applying an electric or magnetic field to the layer or by irradiating the layer with light.

The orientation layer is preferably formed by rubbing treatment of a polymer layer. The polymer for the orientation layer normally has a molecular structure having a function of aligning the liquid crystal molecules.

In addition, the polymer preferably has another function of fixing the alignment of liquid crystal molecules. For example, the polymer comprises a main chain to which a side chain having a crosslinkable functional group (e.g., double bond) is connected. The side chain may have a crosslinkable functional group aligning the liquid crystal molecules.

The polymer for orientation layer is preferably itself crosslinkable or made to be crosslinkable by a crosslinking agent. The crosslinkable polymer is described in Japanese Patent Provisional Publication No. 8(1996)-338913, Paragraph No. 0022. Example of the crosslinkable polymer include polymetacrylate, polystyrene, polyolefin, polyvinyl alcohol, denatured polyvinyl alcohol, poly(N-methylolacrylamide), polyester, polyimide, polyvinyl acetate, carboxymethylcellulose, polycarbonate, and copolymers thereof.

Silane coupling agents may be used. Preferred examples are water-soluble polymers (e.g., poly(N-methylolacrylamide), carboxymethylcellulose, gelatin, polyvinyl alcohol, denatured polyvinyl alcohol). Gelatin, polyvinyl alcohol and denatured polyvinyl alcohol are more preferred, and polyvinyl alcohol and denatured polyvinyl alcohol are most preferred. In particular, two or more polyvinyl alcohols or denatured ones having different polymerization degrees are preferably used in combination.

The saponification degree of polyvinyl alcohol is in the range of preferably 70 to 100%, more preferably 80 to 100%. The polymerization degree is preferably in the range of 100 to 5,000.

The side chain having a function of aligning the liquid crystal molecules generally has a hydrophobic group as the functional group, which is determined according to the liquid crystal molecules and the aimed alignment.

For denaturing polyvinyl alcohol, a denaturing group can be introduced through copolymerization reaction, chain transfer reaction or block polymerization reaction. Examples of the denaturing group include hydrophilic groups (e.g., carboxylic acid group, sulfonic acid group, phosphonic acid group, amino, ammonia, amide, thiol), hydrocarbonyl groups having 10 to 100 carbon atoms, fluorine-substituted hydrocarbonyl groups, alkylthio groups, polymerizable groups (e.g., unsaturated polymerizable groups, epoxy group, aziridinyl group), and alkoxysilyl groups (trialkoxysilyl, dialkoxysilyl, monoalkoxysilyl).

The denatured polyvinyl alcohol is described in Japanese Patent Provisional Publication Nos. 2000-155216 and 2002-62426.

The denatured polyvinyl alcohol is preferably obtained through a reaction between polyvinyl alcohol and the compound represented by the following formula (I) or (II).

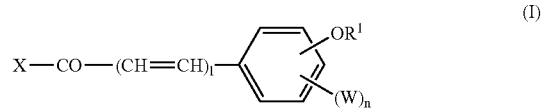

(I)

In the formula (I), $R^1$ is an alkyl group, an acryloylalkyl group, a methacryloyl group or an epoxyalkyl group; W is a halogen atom, an alkyl group or an alkoxy group; X is an atomic group forming an active ester, an acid anhydride or an acid halide; l is an integer of 0 or 1; and n is an integer of 0 to 4.

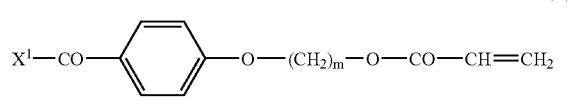

(II)

In the formula (II), $X^1$ is an atomic group forming an active ester, an acid anhydride or an acid halide; and m is an integer of 2 to 24.

If the side chain having crosslinkable functional groups is combined with the main chain of the polymer of orientation layer or if crosslinkable functional groups are introduced into the side chain having a function of aligning the liquid crystal molecules, the polymer of orientation layer can be copolymerized with multifunctional monomers contained in the first optically anisotropic layer. As a result, covalent bonds are formed not only among the multifunctional monomers but also among the polymers of orientation layer and between the multifunctional monomers and the polymers of orientation layer. In this way, if the crosslinkable functional groups are introduced into the polymer of orientation layer, the optical compensatory film is remarkably reinforced.

The crosslinkable functional groups for the polymer of orientation layer, as well as the multifunctional monomers, are preferably polymerizable. The crosslinkable functional group is described in Japanese Patent Provisional Publication No. 2000-155216, Paragraph Nos. 0080-0100.

Apart from the crosslinkable functional group, the polymer of orientation layer can be crosslinked with a crosslinking agent. Examples of the crosslinking agent include aldehydes, N-methylol compounds, dioxane derivatives, compounds inducing the crosslinking reaction when their carboxyl groups are activated, active vinyl compounds, active halogen compounds, iso-oxazoles, and dialdehyde starch. Two or more crosslinking agents may be used in combination. The crosslinking agent is described in Japanese Patent Provisional Publication No. 2002-62426. A highly active aldehyde is preferred, and glutaraldehyde is particularly preferred.

The amount of the crosslinking agent is preferably in the range of 0.1 to 20 wt. %, more preferably in the range of 0.5 to 15 wt. % based on the amount of the polymer. After the crosslinking reaction, non-reacted crosslinking agent remains in an amount of 1.0 wt. % or less, more preferably 0.5 wt. % or less. If the amount of remaining crosslinking agent is thus reduced, a liquid crystal display does not cause reticulation even if used or left under hot and humid condition for a long time.

The degree of crosslinking is preferably high enough to reduce dust caused in the rubbing treatment. The crosslinking degree is defined by the formula: $1-(Ma/Mb)$ in which Ma and Mb are the amounts of remaining crosslinking agent and added crosslinking agent, respectively. The thus defined crosslinking degree is preferably in the range of 50 to 100%, more preferably in the range of 65 to 100%, most preferably in the range of 75 to 100%.

The orientation layer can be formed by the steps of: coating the second optically anisotropic layer with a coating solution containing the above polymer and the crosslinking agent, heating the applied solution to dry (to crosslink), and subjecting the dried layer to the rubbing treatment. The crosslinking reaction is conducted after the coating solution is applied. A mixture of an antifoaming organic solvent (e.g., methanol) and water is preferably used as a solvent of the coating solution in the case where a water-soluble polymer such as a polyvinyl alcohol is used as a material of the orientation layer. If a mixture of methanol and water is used, methanol is contained in an amount of preferably 1 wt. % or more, more preferably 9 wt. % or more. The antifoaming organic solvent reduces bubbles to decrease aligning defects in the resultant orientation layer or in the first optically anisotropic layer remarkably.

The coating solution can be applied according to a conventional coating method such as a spin-coating method, a dip-coating method, a curtain method, an extrusion coating method, a rod coating method or a roll coating method. The rod coating method is particularly preferred.

In the case where a hydrophilic polymer such as polyvinyl alcohol is used in the orientation layer, the water content is controlled in consideration of film-hardness. The water content is preferably in the range of 0.4 to 2.5%, more preferably in the range of 0.6 to 1.6%. The water content can be measured with a commercially available apparatus according to Karl Fischer's method.

The thickness of the dried layer is preferably in the range of 0.1 to 10 µm.

The layer is dried at a temperature of 20 to 110° C. The temperature is preferably 60 to 100° C. so as to crosslink satisfyingly, more preferably 80 to 100° C. The time for drying is in the range of 1 minute to 36 hours, preferably in the range of 1 to 30 minutes. The pH value is preferably controlled so that the used crosslinking agent can work optimally. For example, if glutaraldehyde is used, the pH value is preferably in the range of 4.5 to 5.5.

After the polymer layer is crosslinked, the surface of the layer is subjected to rubbing treatment to prepare the orientation layer.

The rubbing treatment can be conducted in the manner adopted widely in aligning liquid crystal molecules of conventional liquid crystal display. The surface of the layer is rubbed with paper, cloth (gauze, felt, nylon, polyester) or rubber along a certain direction, to give the aligning function. Generally, the layer is rubbed several times with cloth on which fibers having the same length and thickness are provided.

[First Optically Anisotropic Layer]

The first optically anisotropic layer is formed from discotic compound.

The first optically anisotropic layer has a retardation value in the plane (Re1) preferably in the range of 10 to 50 nm, more preferably in the range of 25 to 37 nm.

The first optically anisotropic layer is preferably designed to compensate liquid crystal molecules in the liquid crystal cell displaying a black image. The alignment of liquid crystal molecules in the liquid crystal cell is described in IDW '00, FMC 7-2, pp. 411-414.

The discotic compound is preferably liquid crystal, and may be a liquid crystal polymer having discotic molecular structure. Otherwise, although no longer behaving as liquid crystal, a compound obtained by polymerizing or crosslinking discotic liquid molecules of low molecular weight may be used.

Examples of the discotic compound include benzene derivatives described in C. Destrade et al., Mol. Cryst. vol. 71, pp. 111, (1981); truxene derivatives described in C. Destrade et al., Mol Cryst. vol. 122, pp. 141. (1985), Physics lett. A, vol. 78, pp. 82, (1990); cyclohexane derivatives described in B. Kohn et al., Angew. Chem. vol. 96, pp. 70, (1984); and macrocyclic compounds of azacrown-type or phenylacetylene-type described in J. M. Lehn et al., J. Chem. Commun. pp. 1794, (1985), and J. Zhang et al., J. Am. Chem. Soc. vol. 116, pp. 2655, (1994).

The discotic compound behaving as liquid crystal generally has a structure in which a parent core is located at the center and straight chain groups such as alkyl, alkoxy and substituted benzoyl are radially substituted around the parent core. Molecules of the compound or aggregate thereof are preferably rotationally symmetrical so that the compound can have orientation property. Although formed from discotic compound, the resultant first optically anisotropic layer does not always need to contain the discotic compound. For example, in forming the layer, a low molecular-weight discotid liquid crystal compound having a thermo- or photo-reactive group is polymerized by heat or light to form a polymer that does not behave as liquid crystal. Such polymer can be also used in the invention. The discotic compound is described in Japanese Patent Provisional Publication No. 8(1996)-50206. Japanese Patent Provisional Publication No. 8(1996)-27284 describes polymerization of the discotic compound.

For fixing molecules of the discotic compound by polymerization, a polymerizable group should be bound to a discotic core of the discotic molecule. In order to keep the alignment in the polymerization reaction, a linking group is introduced between the discotic core and the polymerizable group. The discotic compound having a polymerizable group is described in Japanese Patent Provisional Publication No. 2000-155216, Paragraph Nos. 0151-0168.

The discotic compound having a polymerizable group is preferably represented by the following formula:

D(-L-Q)$_n$ in which D is a discotic core; L is a divalent linking group; Q is a polymerizable group; and n is an integer of 4 to 12.

Examples of the discotic cores (D) are shown below. In the examples, LQ (or QL) means the combination of the divalent linking group (L) and the polymerizable group (Q).

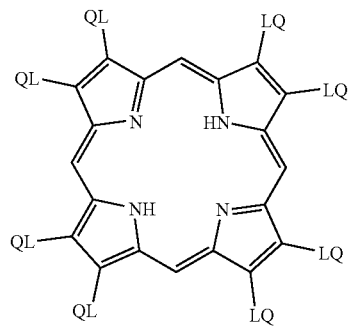
(D1)

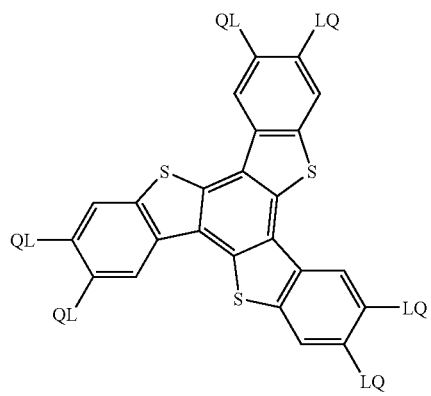
(D2)

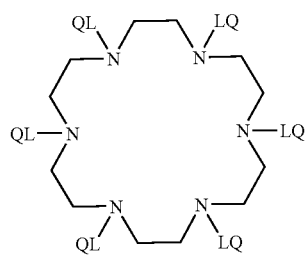
(D3)

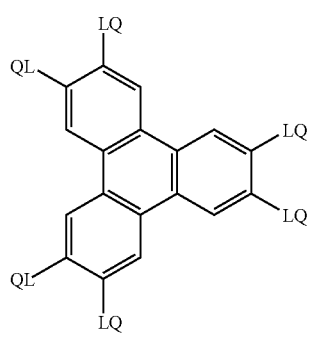
(D4)

-continued

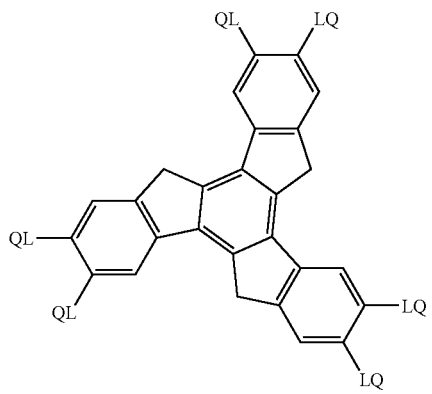
(D5)

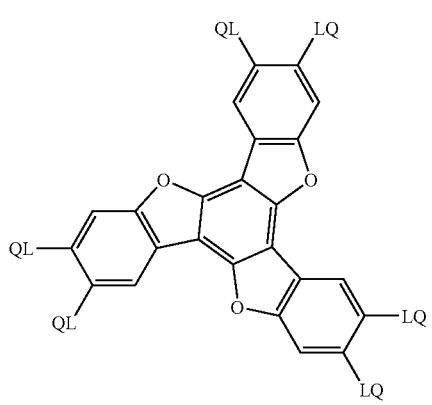
(D6)

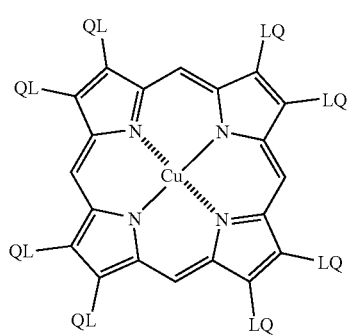
(D7)

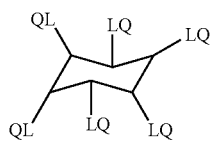
(D8)

-continued
(D9)
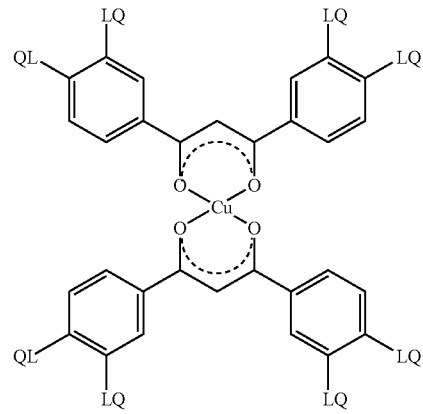
(D10)
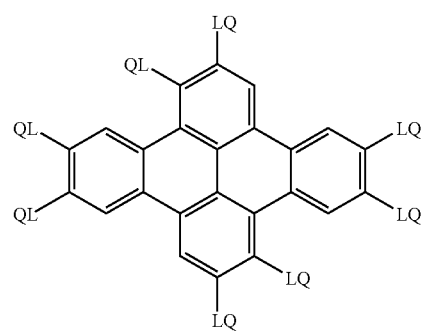
(D11)
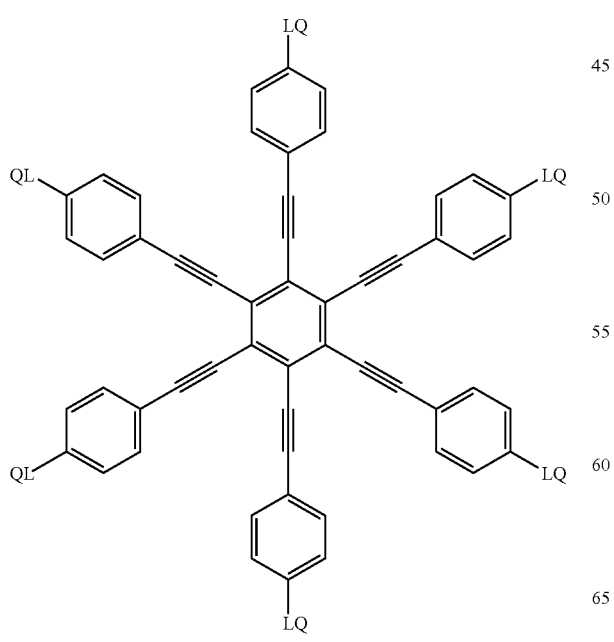
(D12)
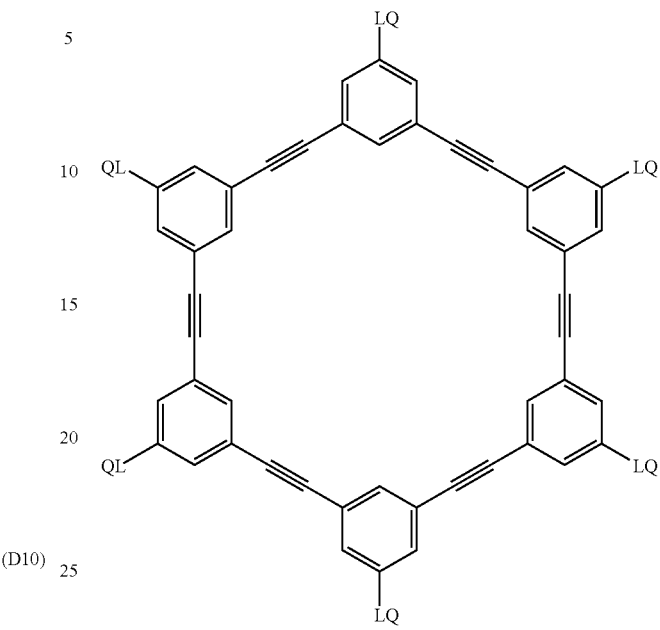
(D13)
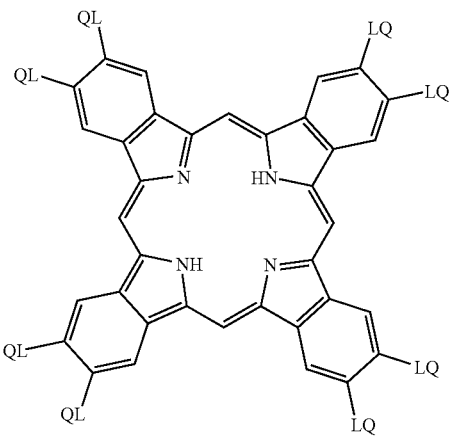
(D14)
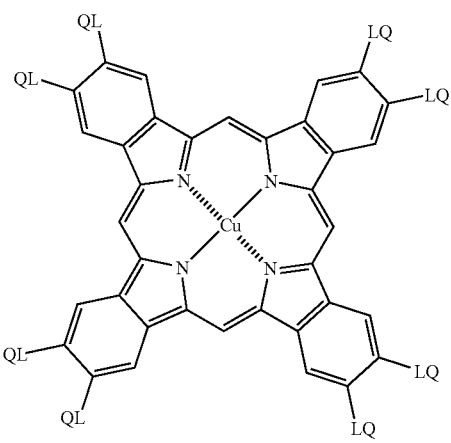

-continued

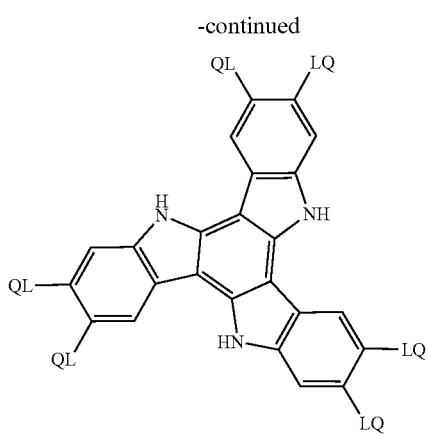

(D15)

In the above formula, the divalent linking group (L) preferably is selected from the group consisting of an alkylene group, an alkenylene group, an arylene group, —CO, —NH—, —O—, —S— and combinations thereof. L more preferably is a divalent linking group comprising at least two divalent groups selected from the group consisting of an alkylene group, an arylene group, —CO—, —NH—, —O— and —S—. L further preferably is a divalent linking group comprising at least two divalent groups selected from the group consisting of an alkylene group, an arylene group, —CO— and —O—. The alkylene group preferably has 1 to 12 carbon atoms. The alkenylene group preferably has 2 to 12 carbon atoms. The arylene group preferably has 6 to 10 carbon atoms.

Examples of the divalent linking groups (L) are shown below. In the examples, the left side is attached to the discotic core (D), and the right side is attached to the polymerizable group (Q). The AL means an alkylene group or an alkenylene group. The AR means an arylene group. The alkylene group, the alkenylene group and the arylene group may have a substituent group (e.g., an alkyl group).

L1:-AL-CO—O-AL-
L2:-AL-CO—O-AL-O—
L3:-AL-CO—O-AL-O-AL-
L4:-AL-CO—O-AL-O—CO—
L5:—CO-AR-O-AL-
L6:—CO-AR-O-AL-O—
L7:—CO-AR-O-AL-O—CO—
L8:—CO—NH-AL-
L9:—NH-AL-O—
L10:—NH-AL-O—CO—
L11:—O-AL-
L12:—O-AL-O—
L13:—O-AL-O—CO—
L14:—O-AL-O—CO—NH-AL-
L15:—O-AL-S-AL-
L16:—O—CO—AR-O-AL-CO—
L17:—O—CO—AR-O-AL-O—CO—
L18:—O—CO-AR-O-AL-O-AL-O—CO—
L19:—O—CO—AR-O-AL-O-AL-O-AL-O—CO—
L20:—S-AL-
L21:—S-AL-O—
L22:—S-AL-O—CO—
L23:—S-AL-S-AL-
L24:—S—AR-AL-

The polymerizable group (Q) in the above formula is determined according to the polymerization reaction. The polymerizable group (Q) preferably is an unsaturated polymerizable group or an epoxy group, more preferably is an unsaturated polymerizable group, and most preferably is an ethylenically unsaturated group.

In the above formula, n is an integer of 4 to 12, which is determined according to the chemical structure of the discotic core (D). The plural combinations of L and Q can be different from each other, but are preferably identical.

In the first optically anisotropic layer, the discotic molecules are aligned so that molecular axes may be at an angle of 43° to 47° on average to the longitudinal direction.

If the discotic molecules are oriented in hybrid alignment, the discotic planes of molecules are inclined from a plane of the polarizing membrane at angles varying in the direction of depth of the first optically anisotropic layer. The angle of each discotic plane generally increases or decreases with increase of distance in the direction of depth from the surface of the polarizing membrane. The angle preferably decreases with increase of the distance. Further, examples of variation of the inclined angle include continuous increase, continuous decrease, intermittent increase, intermittent decrease, variation containing continuous increase and decrease, and intermittent variation containing increase or decrease. The intermittent variation contains an area where the angle does not vary in the course of the thickness direction of the layer. Even if not vary in the course, the angle totally increases or decreases in the layer. The angle preferably varies continuously.

The direction in which discotic molecules on the polarizing membrane side are oriented on average can be generally controlled by selecting the discotic compound or materials of the orientation layer, or by selecting methods of the rubbing treatment. On the other hand, the average direction on the free surface (air) side can be also generally controlled by selecting the discotic compound or additives used together with the compound.

Examples of the additives include plasticizer, surface-active agent, polymerizable monomer and polymer. Further, how much the orientation direction of the long axes varies can be also controlled by the above selection. It is also possible to improve evenness of the layer, strength of the layer and orientation of the discotic molecules by selecting the plasticizer, the surface-active agent and the polymerizable monomer. These additives are preferably compatible with the discotic compound, preferably give variation of the inclined angle, and preferably do not prevent the discotic molecules from aligning.

Examples of the polymerizable monomer include cationic polymerizable compounds and radical-polymerizable compounds. Multifunctional radical-polymerizable monomers are preferred. Polymerizable groups of the monomers are preferably copolymerized with polymerizable groups of the discotic molecules. The polymerizable monomer is described in Japanese Patent Provisional Publication No. 2002-296423, Paragraph Nos. 0018-0020. The polymerizable monomer is added generally in an amount of 1 to 50 wt. %, preferably in an amount of 5 to 30 wt. % based on the amount of the discotic compound.

The surface-active agent is preferably a fluorine-containing compound, and is described in Japanese Patent Provisional Publication No. 2001-330725.

The polymer preferably changes the inclined angle of discotic molecules.

The polymer is preferably cellulose ester or cellulose ether, more preferably cellulose ester. The cellulose ester is described in Japanese Patent Provisional Publication No. 2000-155216, Paragraph No. 0178. In order not to prevent the discotic molecules from aligning, the amount of the polymer is generally in the range of 0.1 to 10 wt. %, preferably in the range of 0.1 to 8 wt. %, more preferably in the range of 0.1 to 5 wt. % based on the amount of the discotic compound.

The transition temperature from discotic nematic phase to solid phase of the discotic compound is preferably in the range of 70 to 300° C., more preferably 70 to 170° C.

For preparing the first optically anisotropic layer, the orientation layer is coated with a coating solution containing the discotic compound and, if needed, other components such as polymerization initiator described later.

Solvent of the coating solution preferably is an organic solvent. Examples of the organic solvents include amides (e.g., N,N-dimethylformamide), sulfoxides (e.g., dimethylsulfoxide), heterocyclic compounds (e.g., pyridine), hydrocarbons (e.g., benzene, hexane), alkyl halides (e.g., chloroform, dichloromethane), esters (e.g., methyl acetate, butyl acetate), ketones (e.g., acetone, methyl ethyl ketone) and ethers (e.g., tetrahydrofuran, 1,2-dimethoxyethane). Alkyl halides and ketones are preferred. Two or more organic solvents can be used in combination.

The solution can be spread according to a conventional coating method (such as a wire-bar coating method, an extrusion coating method, a direct gravure coating method, a reverse gravure coating method or a die coating method).

The thickness of the first optically anisotropic layer is preferably in the range of 0.1 to 20 μm, more preferably in the range of 0.5 to 15 μm, most preferably in the range of 1 to 10 μm.

The aligned discotic molecules can be fixed with the alignment kept. The molecules are fixed preferably by a polymerization reaction. The polymerization reaction can be classified into a thermal reaction with a thermal polymerization initiator and a photoreaction with a photo polymerization initiator. A photo polymerization reaction is preferred.

Examples of the photo polymerization initiators include α-carbonyl compounds (described in U.S. Pat. Nos. 2,367,661, 2,367,670), acyloin ethers (described in U.S. Pat. No. 2,448,828), α-hydrocarbon substituted aromatic acyloin compounds (described in U.S. Pat. No. 2,722,512), polycyclic quinone compounds (described in U.S. Pat. Nos. 2,951,758, 3,046,127), combinations of triarylimidazoles and p-aminophenyl ketones (described in U.S. Pat. No. 3,549,367), acridine or phenazine compounds (described in Japanese Patent Provisional Publication No. 60(1985)-105667 and U.S. Pat. No. 4,239,850) and oxadiazole compounds (described in U.S. Pat. No. 4,212,970).

The amount of the photo polymerization initiator is preferably in the range of 0.01 to 20 wt. %, and more preferably in the range of 0.5 to 5 wt. % based on the solid content of the coating solution.

The light irradiation for the photo polymerization is preferably conducted with ultraviolet rays.

The exposure energy is preferably in the range of 20 mJ/cm$^2$ to 50 J/cm$^2$, more preferably in the range of 20 to 5,000 mJ/cm$^2$, most preferably in the range of 100 to 800 mJ/cm$^2$. The light irradiation can be conducted while the layer is heated to accelerate the photo polymerization reaction.

A protective layer may be provided on the first optically anisotropic layer.

[Production of Optical Compensatory Film]

The optical compensatory film is generally produced in the form of a roll. The rolled optical compensatory film is preferably produced through a process comprising the following successive steps:

(1) subjecting a belt-shaped cellulose ester film (second optically anisotropic layer) or an orientation layer provided on the cellulose ester film to the rubbing treatment with a rubbing roller, (2) coating the rubbed surface with a coating solution containing the discotic compound, (3) drying the spread coating solution and then or at the same time aligning molecules of the discotic compound at a temperature above the transition temperature to liquid crystal, and fixing the alignment to prepare the first optically anisotropic layer, and (4) winding up the belt-shaped laminate comprising the prepared first optically anisotropic layer.

In the above step (3), while the discotic molecules are dried at a temperature above the liquid crystal-transition temperature, a speed (V) of air flowing over the surface in a direction other than the rubbing direction preferably satisfies the following condition. The speed (V) is most preferably in the range of 0 to $2.5 \times 10^{-3} \times \eta$.

$$0 < V < 5.0 \times 10^{-3} \times \eta$$

In the formula, V is a speed of flowing air over the surface of spread discotic compound (m/sec), η is a viscosity (cp) of the first optically anisotropic layer at the temperature for aligning the discotic molecules.

In the optical compensatory film produced successively and stably through the steps (1) to (4), the average of directions (average direction of molecular symmetrical axes in the first optically anisotropic layer) obtained by projecting molecular symmetrical axes of the discotic molecules onto the plane of cellulose ester film (second optically anisotropic layer) is different from the slow axis in the plane of cellulose ester film (i.e., the longitudinal direction of cellulose ester film), and the average direction of molecular symmetrical axes is at an angle of −2° to 2°, preferably −1° to 1°, essentially 0° to the rubbing direction. In other words, the process comprising the steps (1) to (4) is suitable for mass-production.

If the optical compensatory film is installed in a liquid crystal of OCB mode, the average direction of molecular symmetrical axes is preferably at essentially 45° to the slow axis in the plane (longitudinal direction) of cellulose ester film.

In the step (2), a polymerizable discotic compound having crosslinkable functional group is used as the discotic compound. In the step (3), the coating layer is then continuously irradiated with light to polymerize and harden the compound, so that the alignment of the molecules is fixed. After that, the step (4) is successively conducted.

In the step (1), while dust is prevented from rising, the rubbing treatment can be carried out by means of the rubbing roller.

Prior to the step (2), dust may be removed from the rubbed surface of cellulose ester film or orientation layer.

Also prior to the step (2), optical characters of the formed first optically anisotropic layer may be successively measured to evaluate.

The steps (1) to (4) are described in Japanese Patent Provisional Publication No. 9(1997)-73081.

In consideration of handling and durability of rubbing cloth, the rubbing roller used in the step (1) has a diameter of preferably 100 to 500 mm, more preferably 200 to 400 mm. The roller must have a width wider than the conveyed film, and is preferably √2 times as wide as the film. The rotation rate of the roller is preferably low enough to reduce dust, and is determined according to the alignment of the discotic molecules. The rotation rate is preferably in the range of 100 to 1,000 rpm, more preferably in the range of 250 to 850 rpm.

In the rubbing treatment with the roller rotating at a low speed, the cellulose ester film (second optically anisotropic layer) or the orientation layer is preferably heated to keep the alignment of discotic molecules. The temperature of the surface when heated is preferably in the range of (glass transition temperature of material−50° C.) to (glass transition temperature of material+50° C.). If the orientation layer is made of polyvinyl alcohol, the humidity in the rubbing treatment is preferably also controlled. The relative humidity at 25° C. is preferably in the range of 25 to 70%, more preferably in the range of 30 to 60%, most preferably in the range of 35 to 55%.

The conveying speed of the cellulose ester film is preferably in the range of 10 to 100 m/min., more preferably in the range of 15 to 80 m/min. in consideration of productivity and alignment of the liquid crystal molecules. The film can be conveyed in various known systems conventionally used. There is no restriction on the conveying method.

The orientation layer can be formed by spreading and drying a coating solution containing material such as polyvinyl alcohol dissolved in water or in an organic solvent on the cellulose ester film (second optically anisotropic layer). The orientation layer can be formed before the above steps. It is also possible to form the orientation layer continuously on the conveying cellulose ester film (second optically anisotropic layer).

In the step (2), the rubbed surface is coated with a coating solution containing the discotic compound. Solvent of the coating solution preferably is an organic solvent. Examples of the organic solvents include amides (e.g., N,N-dimethylformamide), sulfoxides (e.g., dimethylsulfoxide), heterocyclic compounds (e.g., pyridine), hydrocarbons (e.g., benzene, hexane), alkyl halides (e.g., chloroform, dichloromethane), esters (e.g., methyl acetate, butyl acetate), ketones (e.g., acetone, methyl ethyl ketone) and ethers (e.g., tetrahydrofuran, 1,2-dimethoxyethane). Alkyl halides and ketones are preferred. Two or more organic solvents can be used in combination.

In order to form a highly homogeneous first optically anisotropic layer, the coating solution has a surface tension of preferably 25 mN/m or less, more preferably 22 mN/m or less.

A surface-active agent is preferably added to the coating solution, to reduce the surface tension. As the surface-active agent, a fluorine-containing surface-active agent is preferred. A surface-active agent of fluorine-containing polymer is more preferred, and a surface-active agent of fluoro-aliphatic group-containing polymer is most preferred. The fluorine-containing polymer may be a copolymer comprising fluorine-containing repeating units and other repeating units (for example, units derived from polyoxyalkylene(meth)acrylate).

The fluorine-containing polymer has a weight average molecular weight of preferably 3,000 to 100,000, more preferably 6,000 to 80,000. The amount of the fluorine-containing polymer is preferably in the range of 0.005 to 8 wt. %, more preferably in the range of 0.01 to 1 wt. %, most preferably in the range of 0.05 to 0.5 wt. %, based on the solute (components other than the solvent), which mainly comprises the discotic compound, of the coating solution.

The coating solution can be spread on the rubbed surface according to a conventional coating method (such as a wire-bar coating method, an extrusion coating method, a direct gravure coating method, a reverse gravure coating method or a die coating method). The amount of the spread solution is determined according to the thickness of first optically anisotropic layer.

In the step (3), the spread coating solution is dried and then or at the same time heated at a temperature above the liquid crystal-transition temperature, to align molecules of the discotic compound. The aligned molecules are then fixed to prepare the first optically anisotropic layer. Heating in drying or after drying orients the molecules in a desired alignment. The temperature in drying can be determined according to boiling point of the solvent for the coating solution, the cellulose ester film (second optically anisotropic layer), and material of the orientation layer. The temperature for aligning the discotic molecules depends on the liquid crystal phase-solid phase transition temperature, and is preferably in the range of 70 to 300° C., more preferably in the range of 70 to 170° C.

The viscosity in liquid crystal state is preferably in the range of 10 to 10,000 cp, more preferably in the range of 100 to 1,000 cp. If the viscosity is too low, the liquid crystal molecules are so sensitive to flowing air that the speed and direction of flowing air must be precisely controlled. On the other hand, if the viscosity is too high, the molecules are oriented so slowly that the productivity is impaired though not affected by flowing air.

The viscosity of the liquid crystal layer depends on molecular structure of the discotic compound. It is also possible to control the viscosity by adding the additives (e.g., cellulose ester, cellulose ether) of the first optically anisotropic layer or gelling agent.

The spread coating solution can be blown with air heated at a predetermined temperature, or conveyed in a room heated at the predetermined temperature.

The aligned discotic molecules are fixed with the alignment kept, and thereby the first optically anisotropic layer is formed. The process for fixing the alignment is explained above for the first optically anisotropic layer.

Prior to the step (4), a protective layer can be formed on the first optically anisotropic layer formed in the step (3). For example, a beforehand-prepared protective film can be laminated continuously on the surface of the belt-shaped first optically anisotropic layer.

In the step (4), a belt-shaped laminate comprising the formed first optically anisotropic layer is wound up. For example, the laminate of first and second optically anisotropic layers is continuously wound up around a cylindrical core.

The optical compensatory film obtained in the step (4) is in the form of a roll, and hence is easily handled even if mass-produced. In addition, the rolled film can be easily stored or conveyed.

[Polarizing Plate]

The first and second optically anisotropic layers are combined with the polarizing membrane, to form a polarizing plate.

From the discotic compound, the first optically anisotropic layer can be formed on the orientation layer on the polarizing membrane or directly on the polarizing membrane without the orientation layer. The coating solution is spread on the polarizing membrane (or on the orientation layer thereon) to form the first optically anisotropic layer. Not the second optically anisotropic layer but the first anisotropic layer is formed on the polarizing membrane, so that the polarizing plate can be produced without providing a polymer film between the polarizing membrane and the optically anisotropic layers. Accordingly, the produced polarizing plate is thin enough to reduce stress (distortion×area of cross section×modulus of elasticity) caused by dimension change of the membrane. The polarizing plate less suffering the stress does not leak light and gives an image of high quality even if installed in a large liquid crystal display.

The polarizing membrane may be of coating type (Optiva Inc.) or of aligning type. The polarizing membrane of aligning type comprises a binder and either iodine or a dichromatic dye. Iodine or the dichromatic dye in the polarizing membrane causes polarizing functions when the molecules thereof are oriented. They are preferably oriented along the binder molecules, or otherwise the molecules of dichromatic dye preferably automatically organize to be oriented in a certain direction like liquid crystal molecules do.

Commercially available polarizing membranes are generally produced by immersing stretched polymer films in a bath of iodine or dichromatic dye solution so that the iodine or dichromatic dye may penetrate into the binder. In a commercially available polarizing membrane, the iodine or dichromatic dye is distributed within the depth of approx. 4 μm from each of the top and bottom surfaces (the total thickness of the penetration is approx. 8 μm). However, in order to obtain sufficient polarizability, the depth where the iodine or dichromatic dye is distributed is required to be at least 10 μm in total. How deeply the iodine or dichromatic dye penetrates can be controlled by adjusting the concentration of iodine or dichromatic dye solution, the temperature of bath and/or the time for immersing.

The polarizing membrane is preferably thinner than a commercially available polarizing membrane (having approx. 30 μm). The thickness is more preferably 25 μm or less, further preferably 20 μm or less. The polarizing membrane having a thickness of 20 μm or less prevents a large liquid crystal display of 17 inches from leaking light.

The binder of the polarizing membrane may be crosslinked. A polymer crosslinkable by itself can be used as the binder. Further, a polymer which originally has functional groups or to which functional groups are introduced can be reacted with light, heat or pH variation to form the polarizing membrane. Otherwise, the polymer may be crosslinked with a crosslinking agent. In detail, bonding groups given by the reactive crosslinking agent can be introduced to crosslink the binder of the polarizing membrane.

In a normal process, a coating solution containing the polymer and, if needed, the crosslinking agent is spread to coat the cellulose ester film (second optically anisotropic layer), and then heated to induce the crosslinking reaction. The reaction may be caused at any stage from the first step to the final step of producing the resultant membrane, so long as the resultant membrane has sufficient durability.

Polymers crosslinkable either by itself or with crosslinking agents can be used. Examples of the polymers include polymethyl methacrylate, polyacrylic acid, polymethacrylic acid, polystyrene, polyvinyl alcohol and denatured polyvinyl alcohol, poly(N-methylolacrylamide), polyvinyl toluene, chlorosulfonated polyethylene, nitrocellulose, chlorinated polyolefin (polyvinyl chloride), polyester, polyimide, polyvinyl acetate, polyethylene, carboxymethyl cellulose, polypropylene, polycarbonate, and copolymers thereof (e.g., acrylic acid/methacrylic acid copolymer, styrene/maleinimide copolymer, styrene/vinyltoluene copolymer, vinyl acetate/vinyl chloride copolymer, ethylene/vinyl acetate copolymer). Silane-coupling agents are also usable as the polymer. Preferred examples are water-soluble polymers (e.g., poly(N-methylolacrylamide), carboxymethylcellulose, gelatin, polyvinyl alcohol and denatured polyvinyl alcohol). Gelatin, polyvinyl alcohol and denatured polyvinyl alcohol are particularly preferred, and polyvinyl alcohol and denatured polyvinyl alcohol are most preferred.

The saponification degree of the polyvinyl alcohol or denatured polyvinyl alcohol is in the range of 70 to 100%, preferably in the range of 80 to 100%, more preferably in the range of 95 to 100%. The polymerization degree of the polyvinyl alcohol is preferably in the range of 100 to 5,000.

Examples of the denatured polyvinyl alcohol include polyvinyl alcohols denatured by copolymerization, by chain transfer and by block polymerization. Examples of the denaturing group in the copolymerization include COONa, $Si(OX)_3$ (in which X is hydrogen or an alkyl group), $N(CH_3)_3 \cdot Cl$, $C_9H_{19}COO$, $SO_3Na$ and $C_{12}H_{25}$. Examples of the denaturing group in the chain transfer include COONa, SH and $C_{12}H_{25}$. The polymerization degree of the denatured polyvinyl alcohol is preferably in the range of 100 to 3,000. The denatured polyvinyl alcohol is described in Japanese Patent provisional Publication Nos. 8(1996)-338913, 9(1997)-152509 and 9(1997)-316127.

Non-denatured or alkylthio-denatured polyvinyl alcohols having saponification degrees of 85 to 95% are particularly preferred.

Two or more non-denatured and denatured polyvinyl alcohols may be used in combination.

The crosslinking agent is described in U.S. Re. Pat. No. 23,297. Boron compounds (e.g., boric acid, borax) are also usable as the crosslinking agent.

The more the crosslinking agent is added, the more the durability of polarizing membrane against moisture and heat is improved. However, if the amount of crosslinking agent is 50 wt. % or more based on the amount of the binder, the molecules of iodine or dichromatic dye are poorly aligned. Accordingly, the amount of crosslinking agent is preferably in the range of 0.1 to 20 wt. %, more preferably in the range of 0.5 to 15 wt. % based on the amount of the binder. Even after the crosslinking reaction is completed, the binder contains non-reacted crosslinking agent a little. The amount of the non-reacted crosslinking agent remaining in the binder is preferably not more than 1.0 wt. %, more preferably not more than 0.5 wt. % based on the amount of the binder. If the binder contains the non-reacted agent in an amount of more than 1.0 wt. %, the membrane often has poor durability. If the polarizing membrane containing a considerable amount of remaining crosslinking agent is installed in a liquid crystal display and used for a long time or left under hot and humid condition, the polarizability is often lowered.

Examples of the dichromatic dye include azo dyes, stilbene dyes, pyrazolone dyes, triphenyl methane dyes, quinoline dyes, oxazine dyes, thiazine dyes, and anthraquinone dyes. Water-soluble dyes are preferred. The dichromatic dye preferably has a hydrophilic group (e.g., sulfo, amino, hydroxyl). Examples of the dichromatic dye further include C.I. direct yellow 12, C.I. direct orange 39, C.I. direct orange 72, C.I. direct red 39, C.I. direct red 79, C.I. direct red 81, C.I. direct red 83, C.I. direct red 89, C.I. direct violet 48, C.I. direct blue 67, C.I. direct blue 90, C.I. direct green 59 and C.I. direct acid red 37. Japanese Patent Provisional Publication Nos. 1(1989)-161202, 1(1989)-172906, 1(1989)-172907, 1(1989)-183602, 1(1989)-248105, 1(1989)-265205 and 7(1995)-261024 describe the dichromatic dye.

The dichromatic dye is used in the form of a free acid or a salt (alkali metal salt, ammonium salt, amine salt). Two or more dichromatic dyes may be used in combination, to produce polarizing membranes having various hues. For example, a dichromatic dye or a mixture of various dichromatic dyes showing black hue when polarizing axes are perpendicularly crossed is preferred. The polarizing membrane comprising such dichromatic dye or mixture is excellent in both polarizability and transmittance when singly used.

For producing the polarizing membrane, the binder is stretched in the longitudinal (MD) direction (stretching method), or otherwise the membrane after subjected to the rubbing treatment is dyed with iodine or the dichromatic dye (rubbing method).

In stretching the binder, the stretching ratio is preferably in the range of 2.5 to 30.0, more preferably in the range of 3.0 to 10.0. The stretching can be carried out either in air (dry stretching) or in water (wet stretching). The stretching ratio in dry stretching is preferably in the range of 2.5 to 5.0 while that in wet stretching is preferably in the range of 3.0 to 10.0. The stretching may be carried out several times, and if so the binder can be evenly stretched even in a high stretching ratio. Before thus stretched, the binder may be beforehand laterally or longitudinally pre-stretched (so slightly that the lateral shrinkage may be prevented).

In consideration of production, the binder is preferably stretched in a direction inclined at 10° to 80° to the longitudinal (MD) direction of the membrane. In that case, the binder can be biaxially stretched rightward and leftward in different steps. The biaxial stretching can be carried out in the normal manner conventionally adopted in forming a known film. Since the rightward and leftward stretching speeds in the biaxial stretching are different from each other, it is necessary to form the binder film before stretched so that the thickness at the right side and that at the left side are different from each other. For example, in forming the film by casting a binder solution, a die equipped with a taper can be used so that the amount of the solution cast on the right side and that on the left side may be different from each other.

The inclined angle is preferably corresponding to the angle between the longitudinal or lateral direction of liquid crystal cell and the transmission axes of polarizing plates laminated on both sides of the cell in the liquid crystal display. The inclined angle is normally 45°, but is not always 45° in a recently developed liquid crystal display of transmission type, reflection type or semi-transmission type. The stretching direction is, hence, preferably adjusted according to the designed display.

Thus, a binder film stretched obliquely at 10° to 80° to the MD direction of the polarizing membrane can be produced.

The rubbing treatment can be conducted in the manner adopted widely in aligning liquid crystal molecules of liquid crystal display. The surface of the film is rubbed with paper, cloth (gauze, felt, nylon, polyester) or rubber along a certain direction, to give the aligning function. Generally, the film is rubbed several times with cloth on which fibers having the same length and thickness are provided. It is preferred to use a rubbing roll whose out of roundness, out of cylindricalness and eccentricity are all 30 μm or less. The lapping angle of the film onto the rubbing roll is preferably in the range of 0.1 to 90°. As described in Japanese Patent Provisional Publication No. 8(1996)-160430, the lapping angle may be 360° or more (namely, the film may be wound around the roll) to perform the rubbing treatment stably.

In the case where a long belt-shaped film is subjected to the rubbing treatment, the film is preferably transferred with a constant tension at a speed of 1 to 100 m/minute. The rubbing roll preferably rotates parallel to the transferring direction so freely that the rubbing angle can be desirably set up. The rubbing angle is preferably in the range of 0° to 60°. For the liquid crystal display, the rubbing angle is preferably in the range of 40° to 50°, particularly 45°.

On both surfaces of the polarizing membrane, protective films are preferably provided. One of the protective films is a part of rolled optical compensatory film, to form, for example, a layered structure of protective film/polarizing membrane/second optically anisotropic layer/first optically anisotropic layer in this order, or otherwise a layered structure of protective film/polarizing membrane/second optically anisotropic layer/orientation layer/first optically anisotropic layer in this order. The polarizing membrane and the first optically anisotropic layer may be laminated with an adhesive. Examples of the adhesive include polyvinyl alcoholic resins (including polyvinyl alcohols denatured with acetoacetyl group, sulfonic acid group, carboxyl group or oxyalkylene group) or aqueous solution of boron compounds. Polyvinyl alcoholic resins are preferred.

The layer of adhesive after dried is preferably in the range of 0.01 to 10 μm, more preferably in the range of 0.05 to 5 μm.

The polarizing membrane preferably has such a high transmittance and such a high polarizability that the resultant liquid crystal display can give an image of high contrast. The transmittance at 550 nm is preferably in the range of 30 to 50%, more preferably in the range of 35 to 50%, most preferably in the range of 40 to 50%. The polarizability at 550 nm is preferably in the range of 90 to 100%, more preferably in the range of 95 to 100%, most preferably in the range of 99 to 100%.

On the surface of the polarizing plate, a light-defusing film or an anti-glare film may be laminated.

[Light-defusing or Anti-glare Film]

FIG. 7 is a sectional view schematically illustrating a representative light-defusing film.

The light-defusing film (9) comprises a transparent base film (20) and a thereon-provided light-defusing layer (30) in which first transparent fine particles (41) and second transparent fine particles (42) are dispersed in transparent resin (35). In the following description, a case where particles of two materials (having different refractive indexes) having two different distribution peaks are used is explained by way of example. However, particles of the same material (having the same refractive index) having two different distribution peaks can be used. Transparent fine particles of only one kind may be used.

The first transparent fine particles (41) are made of a transparent resin, for example, are silica fine particles (mean size: 1.0 μm, refractive index: 1.51), and the second transparent fine particles (42) are made of another transparent resin, for example, are styrene beads (mean size: 3.5 μm, refractive index: 1.61). Because of difference in the refractive index between the transparent fine particles (41 and 42) and the transparent resin (35), light is defused. The difference of refractive index is preferably in the range of 0.02 to 0.15. If the difference is less than 0.02, light is often defused little. If the difference is more than 0.15, light is so defused that the whole film is often whitened. The difference of refractive index is more preferably in the range of 0.03 to 0.13, most preferably in the range of 0.04 to 0.10.

On the viewer-side of the polarizing membrane, an anti-reflection layer is preferably provided. The anti-reflection layer also serves as the protective film on the viewer-side of the polarizing membrane. The anti-reflection layer preferably has an inner haze of 50% or more in order to prevent the displayed image from changing hues according to the viewing angle. The anti-reflection layer is described in Japanese Patent Provisional Publication Nos. 2001-33783, 2001-343646 and 2002-328228.

[Liquid Crystal Display]

In a liquid crystal cell of bend alignment mode, rod-like liquid crystal molecules in upper parts and ones in lower parts are essentially reversely (symmetrically) aligned. The liquid crystal, display equipped with the cell of bend alignment mode is described in U.S. Pat. Nos. 4,583,825 and 5,410,422. Since the rod-like liquid crystal molecules near the top and those near the bottom are symmetrically aligned, the liquid crystal cell of bend alignment mode has self-compensating function. Therefore, such mode is referred to as OCB (optically compensatory bend) mode.

In the liquid crystal cell of OCB mode displaying a black image, the rod-like liquid crystal molecules at the central part are standing while those near the substrates are lying.

The liquid crystal cell of bend alignment mode has a value of Δn×d preferably in the range of 100 to 1,500 nm, more preferably in the range of 500 to 1,000 nm.

In a liquid crystal cell of hybrid alignment mode, rod-like liquid crystal molecules in the upper part are oriented in homeotropic alignment while ones in the lower part are in homogeneous alignment. The rod-like liquid crystal molecules as a whole are thus oriented in hybrid alignment. The liquid crystal cell of hybrid alignment mode is preferably installed in a liquid crystal display of reflection type.

The liquid crystal cell of hybrid alignment mode has a value of Δn×d preferably in the range of 50 to 750 nm, more preferably in the range of 250 to 500 nm.

EXAMPLES

In the following examples, each retardation value at the wavelength λ in the plane [Re(λ)] is measured by means of KOBRA21ADH (OJI SCIENTIFIC INSTRUMENTS CO., LTD.) when incident light of λ nm comes into the film in the normal direction. The retardation value at the wavelength λ in the thickness direction [Rth(λ)] is calculated with KOBRA21ADH on the basis of an average retardation value, an assumed average refractive index and the thickness. The average retardation value is an average of Re(λ), a retardation value measured when incident light of λ nm comes into the film in the direction inclined at +40° to the normal around the slow axis (which is determined by KOBRA21ADH) as the inclining axis (axis of rotation), and another retardation value measured when incident light of λ nm comes into the film in the direction inclined at −40° to the normal around the slow axis as the inclining axis (axis of rotation). The average refractive index can be assumed from, for example, Polymer Handbook (JOHN WILEY & SONS, INC.) and catalogues of various optical films. For example, the average refractive index of cellulose ester is assumed 1.48.

Example 1

(Preparation of Second Optically Anisotropic Layer)

In room temperature, 45 weight parts of cellulose acetate having the average acetic acid content of 60.9%, 2.25 weight parts of the following retardation-increasing agent, 232.72 weight parts of methylene chloride, 42.57 weight parts of methanol, and 8.50 weight parts of n-butanol were mixed to prepare a solution (dope). The dope was cast by means of a band-casting machine of 6 m, and dried so that thickness of the dried film may be 100 μm.

Retardation-increasing Agent

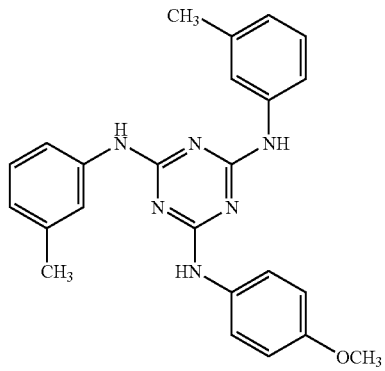

(Formation of Orientation Layer)

On the prepared second optically anisotropic layer, a gelatin-undercoating layer of 0.1 μm thickness was provided. The gelatin-undercoating layer was then coated with the following coating solution in the amount of 28 ml/m² by means of a wire bar coater of #16. The applied solution was dried with hot air at 60° C. for 60 seconds, and then further dried with hot air at 90° C. for 150 seconds. The formed layer was then subjected to rubbing treatment in which the rubbing direction was at the angle of 45° to the slow axis (determined at 632.8 nm) of the second optically anisotropic layer.

Coating Solution for Orientation Layer

| | |
|---|---|
| The following denatured polyvinyl alcohol | 10 weight parts |
| Water | 371 weight parts |
| Methanol | 119 weight parts |
| Glutaric aldehyde (crosslinking agent) | 0.5 weight part |

Denatured Polyvinyl Alcohol

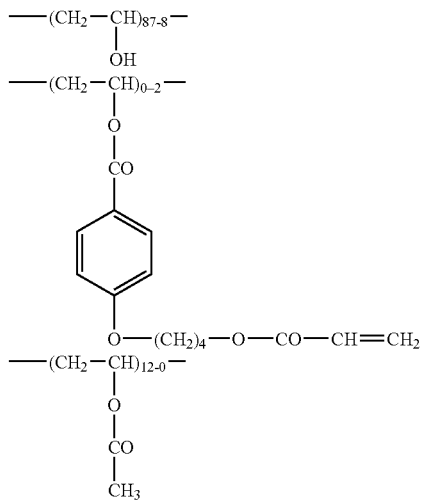

(Formation of First Optically Anisotropic Layer)

In 102 g of methyl ethyl ketone, 41.01 g of the following discotic liquid crystal compound, 4.06 g of ethylene oxide denatured trimethlolpropanetriacrylate (V#360, Osaka Organic Chemicals Co., Ltd.), 0.90 g of cellulose acetate butyrate (CAB-551-0.2, Eastman Chemical), 0.23 g of cellulose acetate butyrate (CAB-531-1, Eastman Chemical), 1.35 g of a photopolymerization initiator (Irgacure 907, Ciba-Geigy) and 0.45 g of a sensitizer (Kayacure DETX, Nippon Kayaku Co., Ltd.) were dissolved to prepare a coating solution. The coating solution was spread to coat the orientation layer by means of a wire bar coater of #3.2. The coated film was fixed on a metal frame and heated in a thermostat zone at 130° C. for 2 minutes to orient the molecules of the discotic compound. The film was irradiated at 130° C. for 4 second with ultraviolet rays emitted from a high-pressure mercury lamp of 120 W/cm, to polymerize the molecules of discotic compound. Thus, a first optically anisotropic layer was formed.

(Discotic Liquid Crystal Compound

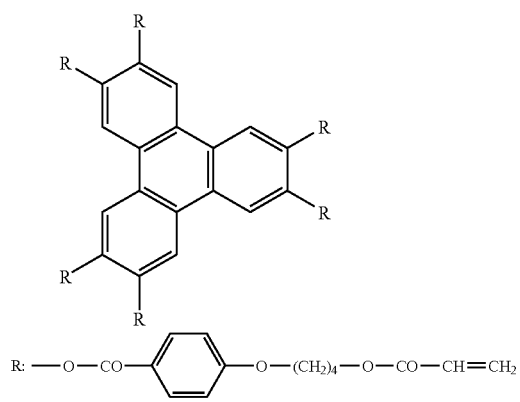

(Production of Polarizing Plate)

The laminate of the first and second optically anisotropic layers was immersed to saponify in a bath of alkaline solution, and then fixed with an adhesive onto a polarizing membrane of polyvinyl alcohol and iodine, so that the membrane was on the second optically anisotropic layer-side. The membrane was placed so that the slow axis of the second optically anisotropic layer might be parallel to the transmission axis of the polarizing membrane.

(Production of Liquid Crystal Display of Bend Alignment Mode)

On a glass plate provided with an ITO electrode, a polyimide layer was formed and the surface of the layer was subjected to rubbing treatment to form an orientation layer. Further, another glass substrate having orientation layer was prepared in the same manner. The thus-prepared two glass plates were faced to each other so that the rubbing directions were parallel to each other, and combined so that the gap between the plates might be 3.5 μm. A commercially available liquid crystal compound ($\Delta n$=0.1396; trade name: ZLI1132, Merck & Co., Inc.) was inserted into the gap, to prepare a liquid crystal cell of bend alignment mode.

(Production and Evaluation of Liquid Crystal Display)

The retardation values (Re1, Rth2) and $\Delta n \times d$ were measured by means of KOBRA21ADH (OJI SCIENTIFIC INSTRUMENTS CO., LTD.). The values of Re1, Rth2 and $\Delta n \times d$ measured at 550 nm were set forth in Table 1, and the values of ($\Delta n \times d$)/(Re1×Rth2) measured at 450 nm, 550 nm and 630 nm were set forth in Table 2.

The liquid crystal cell and a pair of the polarizing plates were combined to produce a liquid crystal display. The cell and the two polarizing plates were placed so that the first optically anisotropic layer and the substrate of the cell might be faced to each other and so that the rubbing direction of the cell might be anti-parallel to that of the first optically anisotropic layer.

Voltage of a square wave (55 Hz) was applied to the liquid crystal cell of bend alignment mode in the liquid crystal display, to display an image. While the voltage was changed, brightness of the displayed image was upward, downward, rightward and leftward measured by means of a luminance meter (TOPCON BM-5) to observe whether inversion of gradation occurred or not. The (front) luminance in displaying a black or white image was also measured at the center of the image by means of a luminance meter (TOPCON BM-5), to evaluate the contrast. Further, while the voltage was changed, voltage giving the smallest (front) luminance in displaying a black image was determined. Furthermore, the viewing angle was measured by means of a meter (EZ-Contrast). The results are set forth in Table 3.

Example 2

The procedures of Example 1 were repeated to produce a polarizing plate.

(Production of Liquid Crystal Display of Bend Alignment Mode)

On a glass plate provided with an ITO electrode, a polyimide layer was formed and the surface of the layer was subjected to rubbing treatment to form an orientation layer. Further, another glass substrate having orientation layer was prepared in the same manner. The thus-prepared two glass plates were faced to each other so that the rubbing directions were parallel to each other, and combined so that the gap between the plates might be 6 μm. A commercially available liquid crystal compound ($\Delta n$=0.1396; trade name: ZLI1132, Merck & Co., Inc.) was inserted into the gap, to prepare a liquid crystal cell of bend alignment mode.

(Production and Evaluation of Liquid Crystal Display)

The retardation values (Re1, Rth2) and $\Delta n \times d$ were measured by means of KOBRA21ADH (OJI SCIENTIFIC INSTRUMENTS CO., LTD.). The values of Re1, Rth2 and $\Delta n \times d$ measured at 550 nm were set forth in Table 1, and the values of ($\Delta n \times d$)/(Re1×Rth2) measured at 450 nm, 550 nm and 630 nm were set forth in Table 2.

The liquid crystal cell and a pair of the polarizing plates were combined to produce a liquid crystal display in the same manner as in Example 1.

Voltage of a square wave (55 Hz) was applied to the liquid crystal cell of bend alignment mode in the liquid crystal display, to display an image. While the voltage was changed, brightness of the displayed image was upward, downward, rightward and leftward measured by means of a luminance meter (TOPCON BM-5) to observe whether inversion of gradation occurred or not. The (front) luminance in displaying a black or white image was also measured at the center of the image by means of a luminance meter (TOPCON BM-5), to evaluate the contrast. Further, while the voltage was changed, voltage giving the smallest (front) luminance in displaying a black image was determined. Furthermore, the viewing angle was measured by means of a meter (EZ-Contrast). The results are set forth in Table 3.

Example 3

The procedures of Example 1 were repeated to produce a polarizing plate.

(Production of Liquid Crystal Display of Bend Alignment Mode)

On a glass plate provided with an ITO electrode, a polyimide layer was formed and the surface of the layer was subjected to rubbing treatment to form an orientation layer. Further, another glass substrate having orientation layer was prepared in the same manner. The thus-prepared two glass plates were faced to each other so that the rubbing directions were parallel to each other, and combined so that the gap between the plates might be 9 μm. A commercially available liquid crystal compound (Δn=0.1396; trade name: ZLI1132, Merck & Co., Inc.) was inserted into the gap, to prepare a liquid crystal cell of bend alignment mode.

(Production and Evaluation of Liquid Crystal Display)

The retardation values (Re1, Rth2) and Δn×d were measured by means of KOBRA21ADH (OJI SCIENTIFIC INSTRUMENTS CO., LTD.). The values of Re1, Rth2 and Δn×d measured at 550 nm were set forth in Table 1, and the values of (Δn×d)/(Re1×Rth2) measured at 450 nm, 550 nm and 630 nm were set forth in Table 2.

The liquid crystal cell and a pair of the polarizing plates were combined to produce a liquid crystal display in the same manner as in Example 1.

Voltage of a square wave (55 Hz) was applied to the liquid crystal cell of bend alignment mode in the liquid crystal display, to display an image. While the voltage was changed, brightness of the displayed image was upward, downward, rightward and leftward measured by means of a luminance meter (TOPCON BM-5) to observe whether inversion of gradation occurred or not. The (front) luminance in displaying a black or white image was also measured at the center of the image by means of a luminance meter (TOPCON BM-5), to evaluate the contrast. Further, while the voltage was changed, voltage giving the smallest (front) luminance in displaying a black image was determined. Furthermore, the viewing angle was measured by means of a meter (EZ-Contrast). The results are set forth in Table 3.

Comparison Example 1

The procedures of Example 1 were repeated to produce a polarizing plate.

(Production of Liquid Crystal Display of Bend Alignment Mode)

On a glass plate provided with an ITO electrode, a polyimide layer was formed and the surface of the layer was subjected to rubbing treatment to form an orientation layer. Further, another glass substrate having orientation layer was prepared in the same manner. The thus-prepared two glass plates were faced to each other so that the rubbing directions were parallel to each other, and combined so that the gap between the plates might be 2.0 μm. A commercially available liquid crystal compound (Δn=0.1396; trade name: ZLI1132, Merck & Co., Inc.) was inserted into the gap, to prepare a liquid crystal cell of bend alignment mode.

(Production and Evaluation of Liquid Crystal Display)

The retardation values (Re1, Rth2) and Δn×d were measured by means of KOBRA21ADH (OJI SCIENTIFIC INSTRUMENTS CO., LTD.). The values of Re1, Rth2 and Δn×d measured at 550 nm were set forth in Table 1, and the values of (Δn×d)/(Re1×Rth2) measured at 450 nm, 550 nm and 630 nm were set forth in Table 2.

The liquid crystal cell and a pair of the polarizing plates were combined to produce a liquid crystal display in the same manner as in Example 1.

Voltage of a square wave (55 Hz) was applied to the liquid crystal cell of bend alignment mode in the liquid crystal display, to display an image. While the voltage was changed, brightness of the displayed image was upward, downward, rightward and leftward measured by means of a luminance meter (TOPCON BM-5) to observe whether inversion of gradation occurred or not. The (front) luminance in displaying a black or white image was also measured at the center of the image by means of a luminance meter (TOPCON BM-5), to evaluate the contrast. Further, while the voltage was changed, voltage giving the smallest (front) luminance in displaying a black image was determined. Furthermore, the viewing angle was measured by means of a meter (EZ-Contrast). The results are set forth in Table 3.

Comparison Example 2

The procedures of Example 1 were repeated to produce a polarizing plate.

(Production of Liquid Crystal Display of Bend Alignment Mode)

On a glass plate provided with an ITO electrode, a polyimide layer was formed and the surface of the layer was subjected to rubbing treatment to form an orientation layer. Further, another glass substrate having orientation layer was prepared in the same manner. The thus-prepared two glass plates were faced to each other so that the rubbing directions were parallel to each other, and combined so that the gap between the plates might be 12 μm. A commercially available liquid crystal compound (Δn=0.1396; trade name: ZLI1132, Merck & Co., Inc.) was inserted into the gap, to prepare a liquid crystal cell of bend alignment mode.

(Production and Evaluation of Liquid Crystal Display)

The retardation values (Re1, Rth2) and Δn×d were measured by means of KOBRA21ADH (OJI SCIENTIFIC INSTRUMENTS CO., LTD.). The values of Re1, Rth2 and Δn×d measured at 550 nm were set forth in Table 1, and the values of (Δn×d)/(Re1×Rth2) measured at 450 nm, 550 nm and 630 nm were set forth in Table 2.

The liquid crystal cell and a pair of the polarizing plates were combined to produce a liquid crystal display in the same manner as in Example 1.

Voltage of a square wave (55 Hz) was applied to the liquid crystal cell of bend alignment mode in the liquid crystal display, to display an image. While the voltage was changed, brightness of the displayed image was upward, downward, rightward and leftward measured by means of a luminance meter (TOPCON BM-5) to observe whether inversion of gradation occurred or not. The (front) luminance in displaying a black or white image was also measured at the center of the image by means of a luminance meter (TOPCON BM-5), to evaluate the contrast. Further, while the voltage was changed, voltage giving the smallest (front) luminance in displaying a black image was determined. Furthermore, the viewing angle was measured by means of a meter (EZ-Contrast). The results are set forth in Table 3.

Example 4

(Preparation of Second Optically Anisotropic Layer)

In room temperature, 45 weight parts of cellulose acetate having the average acetic acid content of 60.9%, 2.25 weight parts of the retardation-increasing agent used in Example 1, 232.72 weight parts of methylene chloride, 42.57 weight parts of methanol, and 8.50 weight parts of n-butanol were mixed to prepare a solution (dope). The dope was cast by means of a band-casting machine of 6 m, and dried so that thickness of the dried film may be 100 μm.

(Formation of Orientation Layer)

On the prepared second optically anisotropic layer, a gelatin-undercoating layer of 0.1 μm thickness was provided. The gelatin-undercoating layer was then coated with the coating solution used in Example 1 in the amount of 28 ml/m² by means of a wire bar coater of #16. The applied solution was dried with hot air at 60° C. for 60 seconds, and then further dried with hot air at 90° C. for 150 seconds. The formed layer was then subjected to rubbing treatment in which the rubbing direction was at the angle of 45° to the slow axis (determined at 632.8 nm) of the second optically anisotropic layer.

(Formation of First Optically Anisotropic Layer)

In 102 g of methyl ethyl ketone, 41.01 g of the discotic liquid crystal compound used in Example 1, 4.06 g of ethylene oxide denatured trimethlolpropanetriacrylate (V#360, Osaka Organic Chemicals Co., Ltd.), 0.90 g of cellulose acetate butyrate (CAB-551-0.2, Eastman Chemical), 0.23 g of cellulose acetate butyrate (CAB-531-1, Eastman Chemical), 1.35 g of a photopolymerization initiator (Irgacure 907, Ciba-Geigy) and 0.45 g of a sensitizer (Kayacure DETX, Nippon Kayaku Co., Ltd.) were dissolved to prepare a coating solution. The coating solution was spread on the orientation layer by means of a wire bar coater of #3. The coated film was fixed on a metal frame and heated in a thermostat zone at 130° C. for 2 minutes to orient the molecules of the discotic compound. The film was irradiated at 130° C. for 4 second with ultraviolet rays emitted from a high-pressure mercury lamp of 120 W/cm, to polymerize the molecules of discotic compound. Thus, a first optically anisotropic layer was formed.

(Production of Polarizing Plate)

The laminate of the first and second optically anisotropic layers was immersed to saponify in a bath of alkaline solution, and then laminated with an adhesive onto a polarizing membrane of polyvinyl alcohol and iodine, so that the membrane was on the second optically anisotropic layer-side. The membrane was placed so that the slow axis of the second optically anisotropic layer might be parallel to the transmission axis of the polarizing membrane.

(Production of Liquid Crystal Display of Bend Alignment Mode)

On a glass plate provided with an ITO electrode, a polyimide layer was formed and the surface of the layer was subjected to rubbing treatment to form an orientation layer. Further, another glass substrate having orientation layer was prepared in the same manner. The thus-prepared two glass plates were faced to each other so that the rubbing directions were parallel to each other, and combined so that the gap between the plates might be 6 μm. A commercially available liquid crystal compound (Δn=0.1396; trade name: ZLI1132, Merck & Co., Inc.) was inserted into the gap, to prepare a liquid crystal cell of bend alignment mode.

(Production and Evaluation of Liquid Crystal Display)

The retardation values ($Re_1$, $Rth_2$) and $\Delta n \times d$ were measured by means of KOBRA21ADH (OJI SCIENTIFIC INSTRUMENTS CO., LTD.). The values of $Re_1$, $Rth_2$ and $\Delta n \times d$ measured at 550 nm were set forth in Table 1, and the values of $(\Delta n \times d)/(Re_1 \times Rth_2)$ measured at 450 nm, 550 nm and 630 nm were set forth in Table 2.

The liquid crystal cell and a pair of the polarizing plates were combined to produce a liquid crystal display in the same manner as in Example 1.

Voltage of a square wave (55 Hz) was applied to the liquid crystal cell of bend alignment mode in the liquid crystal display, to display an image. While the voltage was changed, brightness of the displayed image was upward, downward, rightward and leftward measured by means of a luminance meter (TOPCON BM-5) to observe whether inversion of gradation occurred or not. The (front) luminance in displaying a black or white image was also measured at the center of the image by means of a luminance meter (TOPCON BM-5), to evaluate the contrast. Further, while the voltage was changed, voltage giving the smallest (front) luminance in displaying a black image was determined. Furthermore, the viewing angle was measured by means of a meter (EZ-Contrast). The results are set forth in Table 3.

TABLE 1

| Liquid crystal display | $\Delta n \times d$ | $Re_1$ | $Rth_2$ |
|---|---|---|---|
| Comparison Example 1 | 280 | 35 | 200 |
| Example 1 | 490 | 35 | 200 |
| Example 2 | 840 | 35 | 200 |
| Example 3 | 1,260 | 55 | 200 |
| Comparison Example 2 | 1,680 | 35 | 200 |
| Example 4 | 840 | 28 | 200 |

TABLE 2

| | | $(\Delta n \times d)/(Re_1 \times Rth_2)$ | | |
|---|---|---|---|---|
| Liquid crystal display | d (nm) | 450 nm | 550 nm | 630 nm |
| Comparison Example 1 | 2,000 | 0.04 | 0.04 | 0.04 |
| Example 1 | 3,500 | 0.07 | 0.07 | 0.07 |
| Example 2 | 6,000 | 0.11 | 0.12 | 0.12 |
| Example 3 | 9,000 | 0.17 | 0.18 | 0.18 |
| Comparison Example 2 | 12,000 | 0.22 | 0.24 | 0.24 |
| Example 4 | 6,000 | 0.14 | 0.15 | 0.15 |

TABLE 3

| Liquid crystal display | Viewing angle (vertically and horizontally) | Inversion of image | Contrast |
|---|---|---|---|
| Comparison Example 1 | 60° or less | None | 300 |
| Example 1 | 70° | None | 300 |
| Example 2 | 80° or more | None | 300 |
| Example 3 | 80° or more | None* | 300 |
| Comparison Example 2 | 80° or more | Observed | 300 |
| Example 4 | 80° or more | None | 500 |

(Remark)
None*: Inversion of image was not observed, but an image was slightly distorted.

Example 5

(Preparation of Second Optically Anisotropic Layer)

The following components were placed in a mixing tank, heated and stirred to dissolve, to prepare a cellulose acetate solution.

| Cellulose acetate solution | |
| --- | --- |
| Cellulose acetate (acetylation degree: 60.9%) | 100 weight parts |
| Triphenyl phosphate (plasticizer) | 7.8 weight parts |
| Biphenyldiphenyl phosphate (plasticizer) | 3.9 weight parts |
| Methylene chloride (first solvent) | 300 weight parts |
| Methanol (second solvent) | 45 weight parts |
| Dye (360FP, SUMIKA FIME CHEMICALS CO., LTD.) | 0.0009 weight part |

In another mixing tank, 16 weight parts of the retardation-increasing agent used in Example 1, 80 weight parts of methylene chloride and 20 weight parts of methanol were placed, heated and stirred, to prepare a retardation-increasing agent solution.

After that, 464 weight parts of the cellulose acetate solution, 36 weight parts of the retardation-increasing agent solution used in Example 1 and 1.1 weight parts of silica fine particles (R972, AEROZIL) were mixed and stirred well to prepare a dope. The prepared dope contained the retardation-increasing agent and the silica fine particles in the amounts of 5.0 weight parts and 0.15 weight part, respectively, based on 100 weight parts of cellulose acetate.

The dope was cast by means of a casting machine having a band of 65 m length and 2 m width. After the surface temperature on the band reached 40° C., the cast dope was dried for 1 minute. The formed film was then peeled, and laterally stretched by 28% with a tenter while blowing in hot air at 140° C. The film further blew in hot air at 135° C. for 20 minutes, to prepare a second optically anisotropic layer (cellulose acetate film) in which the solvent remained in the amount of 0.3 wt. %.

The width and thickness of the prepared second optically anisotropic layer were 1,340 mm and 92 μm, respectively. The retardation value (Re) at 590 nm was measured by means of KOBRA21ADH (OJI SCIENTIFIC INSTRUMENTS CO., LTD.), and found 38 nm. The retardation value (Rth) at 590 nm was also measured to find 175 nm.

The surface of second optically anisotropic layer on the band side was coated with 1.0 N sodium hydroxide solution (solvent: mixture of water/isopropyl alcohol/propylene glycol=69.2 weight parts/15 weight parts/15.8 weight parts) in the amount of 10 cc/m². After the film was held at approx. 40° C. for 30 seconds, the alkali solution was wiped. The film was washed with pure water, and remaining drops of water were blown away with an air knife. The film was further dried at 100° C. for 15 seconds.

The surface thus treated with alkali gave the contact angle of 42° to pure water.

(Preparation of Orientation Layer)

The alkali-treated surface of the second optically anisotropic layer was coated with a coating solution of the following composition in the amount of 28 ml/m² by means of a wire bar coater of #16. The spread solution was then dried in hot air flowing at 60° C. for 60 seconds, and further dried in hot air flowing at 90° C. for 150 seconds. Thus, an orientation layer was formed.

| Coating solution for orientation layer | |
| --- | --- |
| The denatured polyvinyl alcohol used in Example 1 | 10 weight parts |
| Water | 371 weight parts |
| Methanol | 119 weight parts |
| Glutaric aldehyde (crosslinking agent) | 0.5 weight part |
| Citric ester (AS3, Sankio Chemical Co., Ltd.) | 0.35 weight part |

(Rubbing Treatment)

The second optically anisotropic layer on which the orientation layer was provided was transferred at the speed of 20 m/minute. A rubbing roller (diameter: 300 mm) was set so that the second optically anisotropic layer could be subjected to rubbing treatment in which the rubbing direction was at the angle of 45° to the longitudinal direction, and rotated at 650 rpm. Thus, the surface of orientation layer was subjected to the rubbing treatment. The contact length between the roller and the support was 18 mm.

(Formation of First Optically Anisotropic Layer)

In 102 kg of methyl ethyl ketone, 41.01 kg of the discotic liquid crystal compound used in Example 1, 4.06 kg of ethylene oxide denatured trimethlolpropanetriacrylate (V#360, Osaka Organic Chemicals Co., Ltd.), 0.35 kg of cellulose acetate butyrate (CAB-531-1, Eastman Chemical), 1.35 kg of a photopolymerization initiator (Irgacure 907, Ciba-Geigy) and 0.45 kg of a sensitizer (Kayacure DETX, Nippon Kayaku Co., Ltd.) were dissolved. To the prepared solution, 0.1 kg of a fluorine surface-active agent (Megafac F-104, Dainippon Ink & Chemicals Inc.) was dissolved to prepare a coating solution. While the second optically anisotropic layer was transferred at 20 m/minute, the coating solution was continuously spread to coat the orientation layer on the second optically anisotropic layer by means of a wire-bar of #3.2 rotating at 391 rpm so that the rotation might follow the transference.

The temperature was continuously raised from room temperature to 100° C., to dry the spread solution. The coated film was then transferred to a drying zone heated at 130° C., and exposed to flowing air. for approx. 90 seconds so that molecules of the discotic liquid crystal compound might be aligned. In the drying zone, the air was made to flow at the speed of 2.5 m/sec near the film surface. Successively, the film was further transferred to another drying zone heated at 80° C., and exposed to ultraviolet rays of 600 mW for 4 seconds with the surface of support heated at approx. 100° C. (surface temperature). The ultraviolet rays were emitted from a UV exposure apparatus [power of UV lamp: 160 W/cm, length of lamp: 1.6 m]. Thus, the aligned discotic liquid crystal molecules were fixed. After cooled to room temperature, the film was cylindrically wound up into a roll to produce a rolled optical compensatory film.

The viscosity of the first optically anisotropic layer was measured at the surface temperature of 127° C., and found 695 cp. In the measurement, a liquid crystal layer comprising the same components (except the solvent) as the first optically anisotropic layer was prepared and its viscosity was measured with an E-viscosimeter of heating type to estimate the viscosity of the first optically anisotropic layer.

A piece of the rolled optical compensatory film was clipped and used as the sample in the evaluation of optical characters. The retardation values Re(0), Re(40) and Re(−40) of the first optically anisotropic layer were measured at 546 nm and found 30.5 nm, 44.5 nm and 107.5 nm, respectively.

It was also found that, in the first optically anisotropic layer, the angle between the discotic plane of discotic liquid crystal molecule and the surface of support (namely, inclined angle) varied continuously according the depth and was 32° on average. Further, after only the first optically anisotropic layer was peeled from the sample, the average direction of lines of molecular symmetry in the first optically anisotropic layer was measured and found that the lines of molecular symmetry were oriented on average at 45° to the longitudinal direction.

The sample was placed between a pair of polarizers (Glan-Thompson prisms), and alignment of the molecules in the first optically anisotropic layer was measured. The optical elements were arranged so that the transmission axis of incident polarizer, the slow axis of transparent support, the slow axis of optically anisotropic layer were at angles of 90°, 20° and 155°, respectively, when seen from the outward polarizer. In that arrangement, the smallest 100×(T−C)/(P−C) was observed when the outward polarizer was placed at 182°. The smallest 100×(T−C)/(P−C) was 0.0033.

The polarizers were placed in crossed Nicols arrangement, and then it was observed whether an image given by the optical compensatory film had defects or not. As a result, no defect was observed when the film was seen frontally or obliquely at 60° to the normal.

(Preparation of Polarizing Plate)

The optical compensatory film was laminated with a polyvinyl alcohol adhesive on a polarizing membrane so that the support-side of the film might be in contact with the membrane. On the other hand, a commercially available triacetyl cellulose film (thickness: 80 μm, TD-80U, Fuji Photo Film Co., Ltd.) was saponified and laminated on the opposite surface of the polarizing membrane with the polyvinyl alcohol adhesive.

The polarizing membrane, the second optically anisotropic layer and the commercially available triacetyl cellulose film were placed so that their longitudinal directions might be parallel to each other. Thus, a polarizing plate comprising (only) the optical compensatory film was produced.

Independently, the optical compensatory film was laminated with a polyvinyl alcohol adhesive on a polarizing membrane so that the support-side of the film might be in contact with the membrane. On the other hand, a commercially available anti-reflection film (ClearView UA, Fuji Photo Film Co., Ltd.) was saponified and laminated on the opposite surface of the polarizing membrane with the polyvinyl alcohol adhesive.

The polarizing membrane, the transparent support and the commercially available triacetyl cellulose film were placed so that their longitudinal directions might be parallel to each other. Thus, a polarizing plate comprising the optical compensatory film and the anti-reflection film was produced.

(Preparation of Liquid Crystal Cell of Bend Alignment)

On a glass plate having an ITO electrode, an orientation layer of polyimide was provided and subjected to a rubbing treatment. This procedure was repeated to prepare two substrates, and the substrates were arranged face-to-face so that the rubbing directions might be parallel and so that the gap might be 4.5 μm. Between them, a liquid crystal having Δn of 0.1396 (ZLI1132, Merck & Co., Inc.) was introduced to prepare a liquid crystal cell of bend alignment. The size of the cell was 20 inches.

(Preparation of Liquid Crystal Display)

The polarizing plate comprising (only) the optical compensatory film and the plate comprising the optical compensatory film and the anti-reflection film were laminated on the liquid crystal cell, so that the cell might be between the plates and so that the plate comprising both compensatory film and anti-reflection film might be on the viewer side. The plates were arranged so that the first optically anisotropic layer in each plate might face to the cell substrate and so that the rubbing directions of the cell and the first optically anisotropic layer might be anti-parallel.

(Evaluation of Liquid Crystal Display)

Voltage of a square wave (55 Hz) was applied to the liquid crystal cell. An image was displayed according to normally white mode (white: 2V, black: 5V). A ratio of transmittance (white/black) was measured by means of a meter (EZ-Contrast 160D, ELDIM) at eight displaying states of L1 (full black) to L8 (full white), to determine the contrast ratio. A front contrast (CR: ratio of brightness in displaying a white image/a black image) was also measured.

The results are set forth in Table 4.

The liquid crystal display was adjusted to display an image of half tone as a whole, and it was observed whether the displayed image had defects or not. As a result, no defect was observed when the display was seen in any direction.

The retardation values (Re1, Rth2) and Δn×d were measured by means of KOBRA21ADH (OJI SCIENTIFIC INSTRUMENTS CO., LTD.). The values of (Δn×d)/(Re1× Rth2) measured at 450 nm, 550 nm and 630 nm were set forth in Table 5.

Example 6

(Preparation of Second Optically Anisotropic Layer)

The cellulose acetate solution and the retardation increasing agent solution prepared in Example 5 were mixed and stirred well to prepare a dope. The prepared dope contained the retardation-increasing agent in the amount of 7.5 weight parts based on 100 weight parts of cellulose acetate.

The prepared dope was cast on a band by means of a band-casting machine in the same manner as in Example 5. The formed film was stretched in the same manner as in Example 5 except that the stretching ratio was changed into 20%, to prepare a second optically anisotropic layer (cellulose acetate film) containing the solvent remaining in the amount of 0.3 wt. %.

The prepared second optically anisotropic layer had the width of 1,500 mm and the thickness of 95 μm. The retardation value (Re) at 590 nm was measured by means of KOBRA21ADH (OJI SCIENTIFIC INSTRUMENTS CO., LTD.), and found 35 nm. The retardation value (Rth) at 590 nm was also measured to find 200 nm.

The second optically anisotropic layer was immersed at 25° C. for 2 minutes in 2.0 N potassium hydroxide solution, neutralized with sulfuric acid, washed with pure water, and dried. The surface energy of the transparent support was measured according to the contact angle method, to find 63 mN/m.

(Formation of Orientation Layer)

The following coating solution was spread to coat the second optically anisotropic layer in the amount of 28 ml/m² by means of a wire bar coater of #16. The spread solution was dried with hot flowing air at 60° C. for 60 seconds, and then further dried with hot flowing air at 90° C. for 150 seconds.

| Coating solution for orientation layer | |
|---|---|
| The denatured polyvinyl alcohol used in Example 1 | 10 weight parts |
| Water | 371 weight parts |

| Coating solution for orientation layer | |
|---|---|
| Methanol | 119 weight parts |
| Glutaric aldehyde (crosslinking agent) | 0.5 weight part |

(Rubbing Treatment)

The second optically anisotropic layer was transferred at the speed of 20 m/minute. A rubbing roller (diameter: 300 mm) was set so that the transferred support could be subjected to rubbing treatment in which the rubbing direction was at the angle of 45° to the longitudinal direction, and rotated at 450 rpm. Thus, the surface of the orientation layer was subjected to the rubbing treatment.

(Formation of Optically Anisotropic Layer)

In 102 kg of methyl ethyl ketone, 41.01 kg of the discotic liquid crystal compound used in Example 1, 4.06 kg of ethylene oxide denatured trimethlolpropanetriacrylate (V#360, Osaka Organic Chemicals Co., Ltd.), 0.29 kg of cellulose acetate butyrate (CAB-531-1, Eastman Chemical), 1.35 kg of a photopolymerization initiator (Irgacure 907, Ciba-Geigy), 0.45 kg of a sensitizer (Kayacure DETX, Nippon Kayaku Co., Ltd.) and 0.45 kg of citric ester (AS3, Sankio Chemical Co., Ltd.) were dissolved, and 0.1 kg of the following fluoroaliphatic group-containing copolymer was added to prepare a coating solution. While the transparent support was transferred at 20 m/minute, the coating solution was continuously spread to coat the orientation layer on the support by means of a wire-bar of #2.7 rotating at 391 rpm so that the rotation might follow the transference.

Fluoroaliphatic Group-containing Copolymer

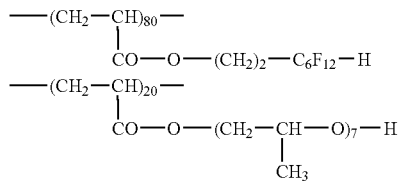

The temperature was continuously raised from room temperature to 100° C., to dry the spread solution. The coated film was then transferred to a drying zone heated at 135° C., and exposed to air flowing at 1.5 m/sec for approx. 90 seconds so that molecules of the discotic liquid crystal compound might be aligned. Successively, the film was further transferred to another drying zone heated at 80° C., and exposed to ultraviolet rays of 600 mW for 4 seconds with the surface of support heated at approx. 100° C. (surface temperature). The ultraviolet rays were emitted from a UV exposure apparatus [power of UV lamp: 160 W/cm, length of lamp: 1.6 m]. Thus, the aligned discotic liquid crystal molecules were crosslinked and thereby fixed. After cooled to room temperature, the film was cylindrically wound up into a roll to produce a rolled optical compensatory film.

The viscosity of the first optically anisotropic layer was measured at the surface temperature of 131° C., and found 600 cp. In the measurement, a liquid crystal layer comprising the same components (except the solvent) as the first optically anisotropic layer was prepared and its viscosity was measured with an E-viscosimeter of heating type to estimate the viscosity of the first optically anisotropic layer.

A piece of the rolled optical compensatory film was clipped and used as the sample in the evaluation of optical characters.

The retardation values Re(0), Re(40) and Re(−40) of the first optically anisotropic layer were measured at 546 nm, and found 34.3 nm, 51.2 nm and 120.5 nm, respectively.

It was also found that, in the first optically anisotropic layer, the angle between the discotic plane of discotic liquid crystal molecule and the surface of support (namely, inclined angle) varied continuously according the depth and was 33° on average. Further, after only the first optically anisotropic layer was peeled from the sample, the average direction of lines of molecular symmetry in the first optically anisotropic layer was measured and found that the lines of molecular symmetry were oriented on average at 45.5° to the longitudinal direction.

The sample was placed between a pair of polarizers (Glan-Thompson prisms), and alignment of the molecules in the first optically anisotropic layer was measured. The optical elements were arranged so that the transmission axis of incident polarizer, the slow axis of transparent support, the slow axis of optically anisotropic layer were at angles of 90°, 20° and 155°, respectively, when seen from the outward polarizer. In that arrangement, the smallest 100×(T−C)/(P−C) was observed when the outward polarizer was placed at 181°. The smallest 100×(T−C)/(P−C) was 0.0029.

The polarizers were placed in crossed Nicols arrangement, and then it was observed whether an image given by the optical compensatory film had defects or not. As a result, no defect was observed when the film was seen frontally or obliquely at 60° to the normal.

(Preparation of Polarizing Plate)

The optical compensatory film was laminated with a polyvinyl alcohol adhesive on a polarizing membrane so that the support-side of the film might be in contact with the membrane. On the other hand, a commercially available triacetyl cellulose film (thickness: 80 μm, TD-80U, Fuji Photo Film Co., Ltd.) was saponified and laminated on the opposite surface of the polarizing membrane with the polyvinyl alcohol adhesive.

The polarizing membrane, the second optically anisotropic layer and the commercially available triacetyl cellulose film were placed so that their longitudinal directions might be parallel to each other. Thus, a polarizing plate was produced.

(Preparation of Liquid Crystal Cell of Bend Alignment)

On a glass plate having an ITO electrode, an orientation layer of polyimide was provided and subjected to a rubbing treatment. This procedure was repeated to prepare two substrates, and the substrates were arranged face-to-face so that the rubbing directions might be parallel and so that the gap might be 6 μm. Between them, a liquid crystal having Δn of 0.1396 (ZLI1132, Merck & Co., Inc.) was introduced to prepare a liquid crystal cell of bend alignment. The size of the cell was 20 inches.

(Preparation of Liquid Crystal Display)

A pair of the polarizing plate was laminated on the liquid crystal cell, so that the cell might be between the plates. The plates were arranged so that the first optically anisotropic layer in each plate might face to the cell substrate and so that the rubbing directions of the cell and the first optically anisotropic layer might be anti-parallel.

(Evaluation of Liquid Crystal Display)

Voltage of a square wave (55 Hz) was applied to the liquid crystal cell. An image was displayed according to normally white mode (white: 2V, black: 6V). A ratio of transmittance (white/black) was measured by means of a meter (EZ-Contrast 160D, ELDIM) at eight displaying states of L1 (full black) to L8 (full white), to determine the contrast ratio. A front contrast (CR: ratio of brightness in displaying a white image/a black image) was also measured.

The results are set forth in Table 4.

The liquid crystal display was adjusted to display an image of half tone as a whole, and it was observed whether the displayed image had defects or not. As a result, no defect was observed when the display was seen in any direction.

The retardation values (Re1, Rth2) and Δn×d were measured by means of KOBRA21ADH (OJI SCIENTIFIC INSTRUMENTS CO., LTD.). The values of (Δn×d)/(Re1×Rth2) measured at 450 nm, 550 nm and 630 nm were set forth in Table 5.

TABLE 4

| Optical compensatory film | $\frac{100 \times (T - C)}{P - C}$ | Front contrast | Viewing angle (contrast > 10) | |
|---|---|---|---|---|
| | | | up/down | left/right |
| Example 5 | 0.0033 | 480 | 80°/80° | 80°/80° |
| Example 6 | 0.0029 | 530 | 80°/80° | 80°/80° |

TABLE 5

| Liquid crystal display | (Δn × d)/(Re1 × Rth2) | | |
|---|---|---|---|
| | 450 nm | 550 nm | 630 nm |
| Example 5 | 0.11 | 0.12 | 0.12 |
| Example 6 | 0.11 | 0.12 | 0.12 |

Example 7

(Preparation of Liquid Crystal Cell of Hybrid Alignment)

On a glass plate having an ITO electrode, an orientation layer of polyimide was provided and subjected to a rubbing treatment. Independently, on another glass plate having an ITO electrode, an orientation layer of deposited SiO was provided. The thus-produced glass substrates were arranged face-to-face so that the gap (d) might be 4 μm. Between them, rod-like liquid crystal compound (ZLI1132, Merck & Co., Inc.) was introduced to prepare a liquid crystal cell of hybrid alignment (HAN type). The values of Δn and Δn×d were 0.1396 and 558 nm, respectively.

(Preparation of Liquid Crystal Display)

On the prepared liquid crystal cell of hybrid alignment, the optical compensatory film produced in Example 1 was laminated so that the first optically anisotropic layer might be on the cell-side. The polarizing plate produced in Example 1 was placed thereon (on the first optically anisotropic layer-side), so that the transmission axis of the polarizing plate was at 45° to the rubbing direction of the cell. Further, a light-diffusing film shown in FIG. 7 was placed thereon.

On the opposite side of the liquid crystal cell, a mirror as the reflection board was placed on the (outer) surface of the glass substrate of the cell. Thus, a liquid crystal display of reflection type was produced.

In front of the liquid crystal display of reflection type, a light source was placed in a direction inclined at 20° from the normal. While the liquid crystal display was irradiated with the light source, voltage of a square wave (55 Hz) was applied to the liquid crystal cell to display an image according to normally white mode (white: 2V, black: 6V).

The image was displayed with high contrast.

The value of (Δn×d)/(Re1×Rth2) was measured by means of KOBRA21ADH (OJI SCIENTIFIC INSTRUMENTS CO., LTD.) at 450 nm, 550 nm and 630 nm, and the results were set forth in Table 6.

TABLE 6

| Liquid crystal display | (Δn × d)/(Re1 × Rth2) | | |
|---|---|---|---|
| | 450 nm | 550 nm | 630 nm |
| Example 7 | 0.05 | 0.05 | 0.05 |

CAPTION OF THE DRAWINGS

Figure 1:
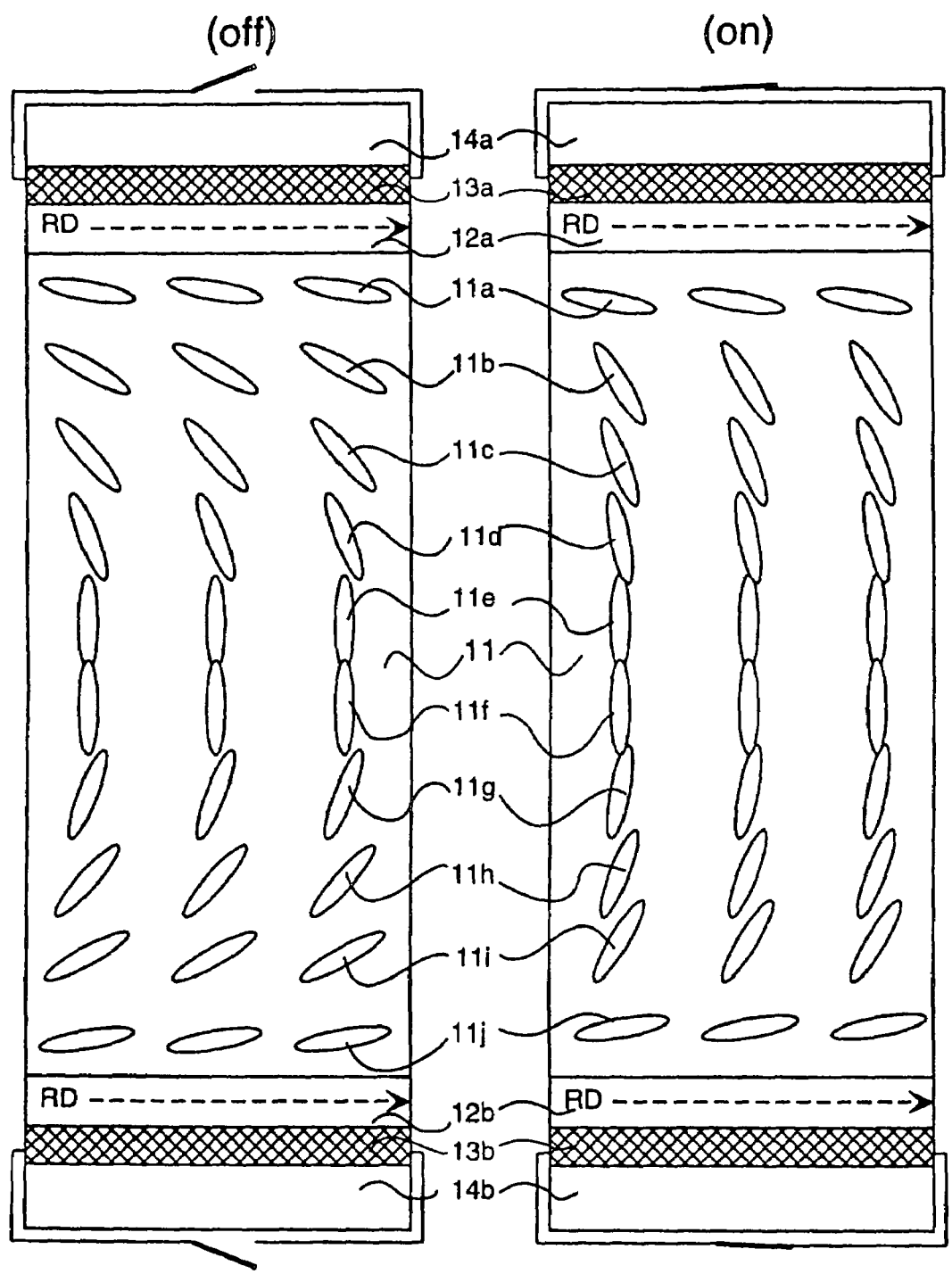
FIG. 1: a sectional view schematically illustrating alignment of liquid crystal molecules in a liquid crystal cell of bend alignment mode.
Figure 2:
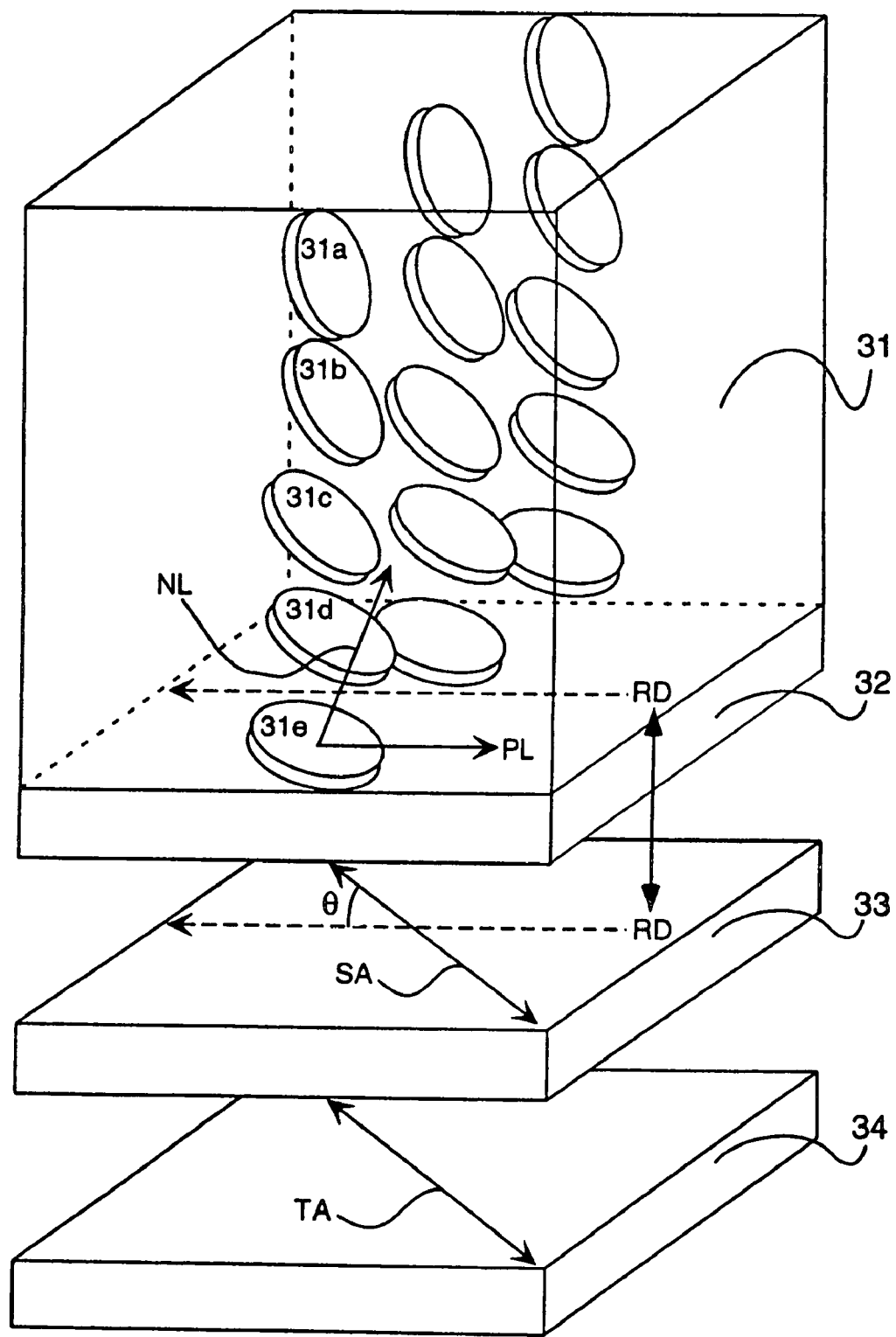
FIG. 2: a sketch schematically illustrating a polarizing plate.
Figure 3:
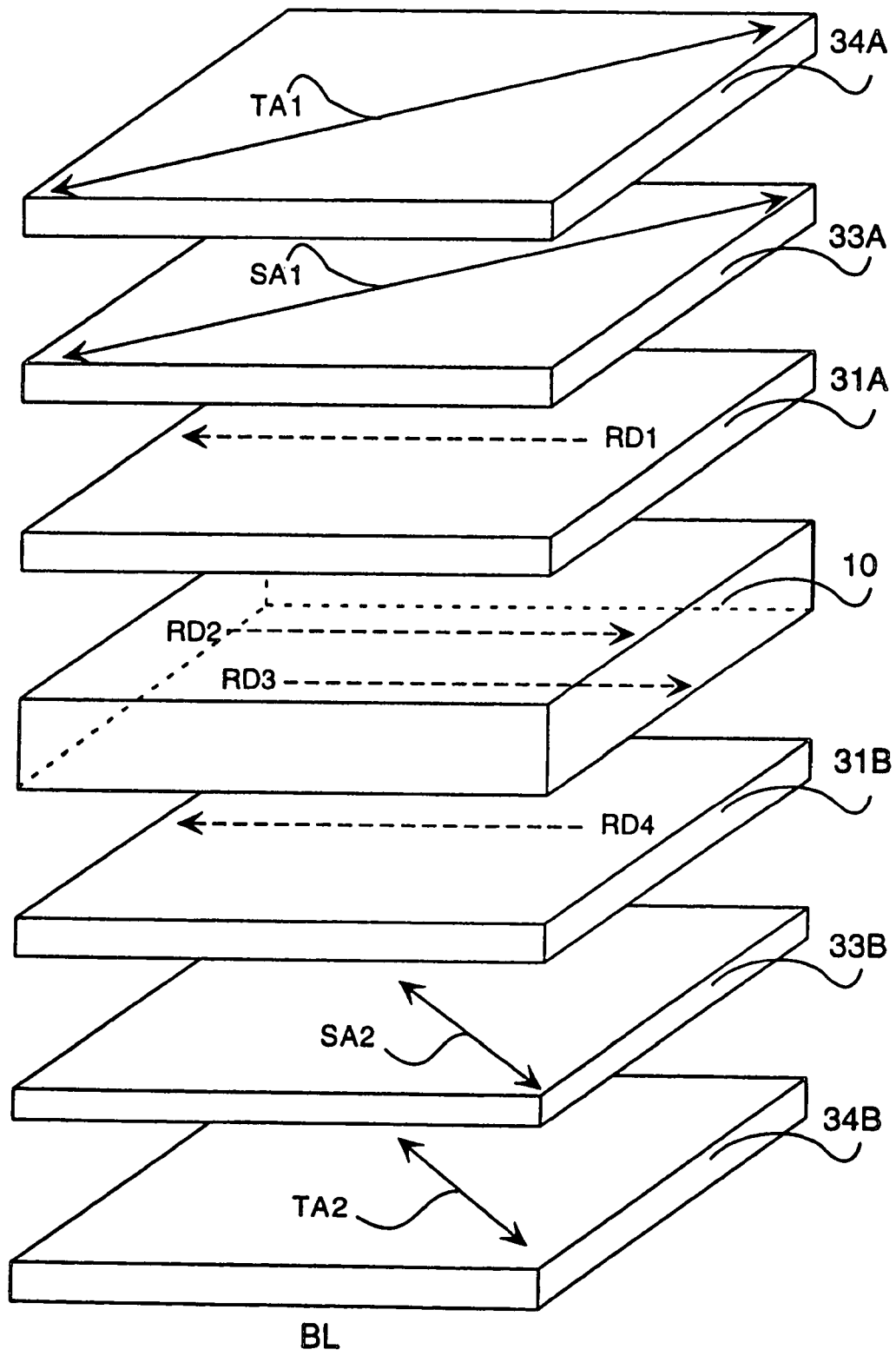
FIG. 3: a sketch schematically illustrating a liquid crystal display of bend alignment mode according to the invention.
Figure 4:
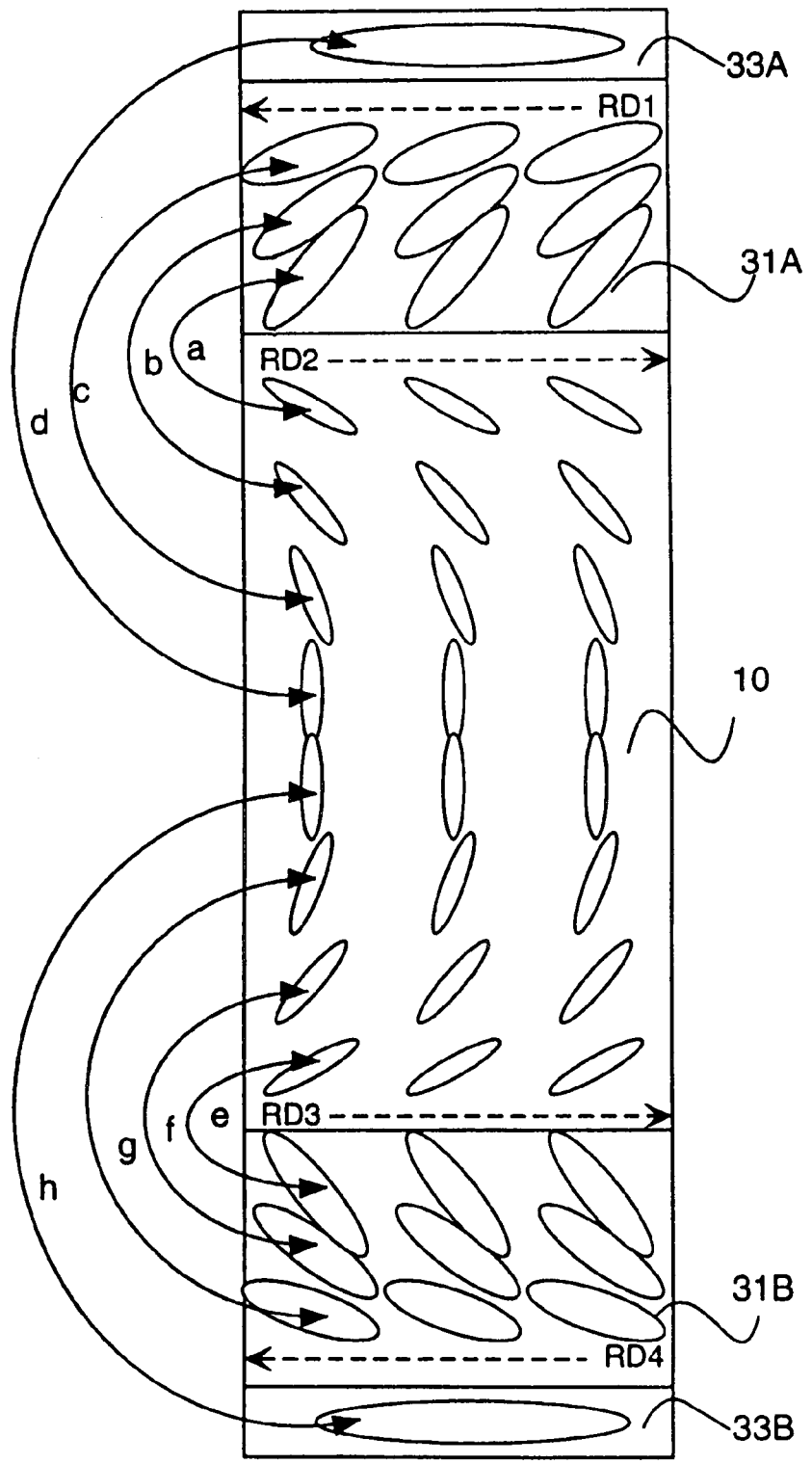
FIG. 4: a sectional view schematically showing mechanism of compensation in a liquid crystal display of bend alignment mode.
Figure 5:
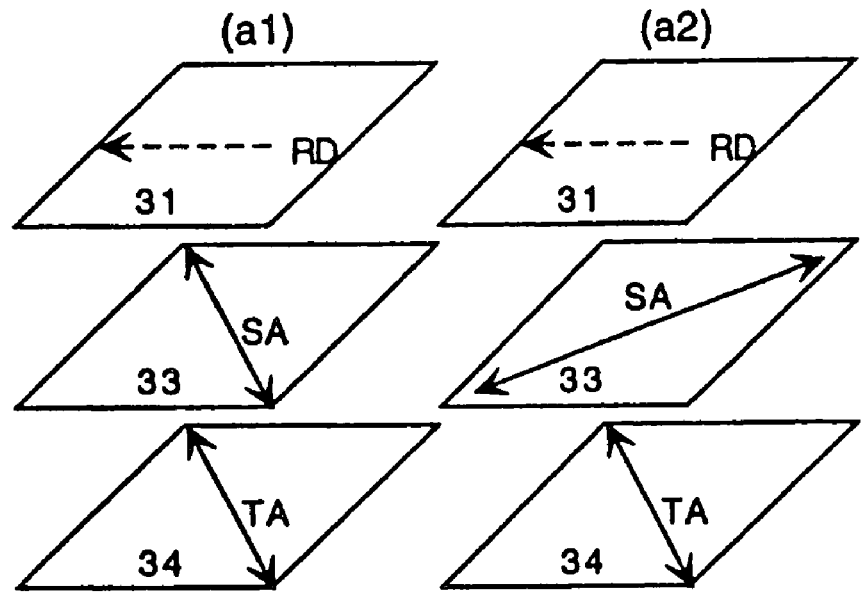
FIG. 5: a sketch schematically illustrating various embodiments of polarizing plate.
Figure 5:
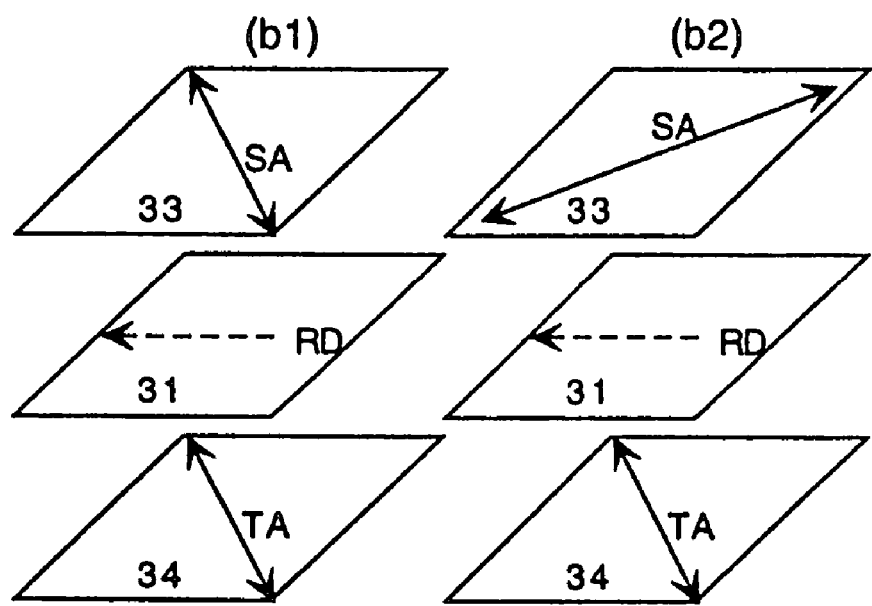
Figure 6:
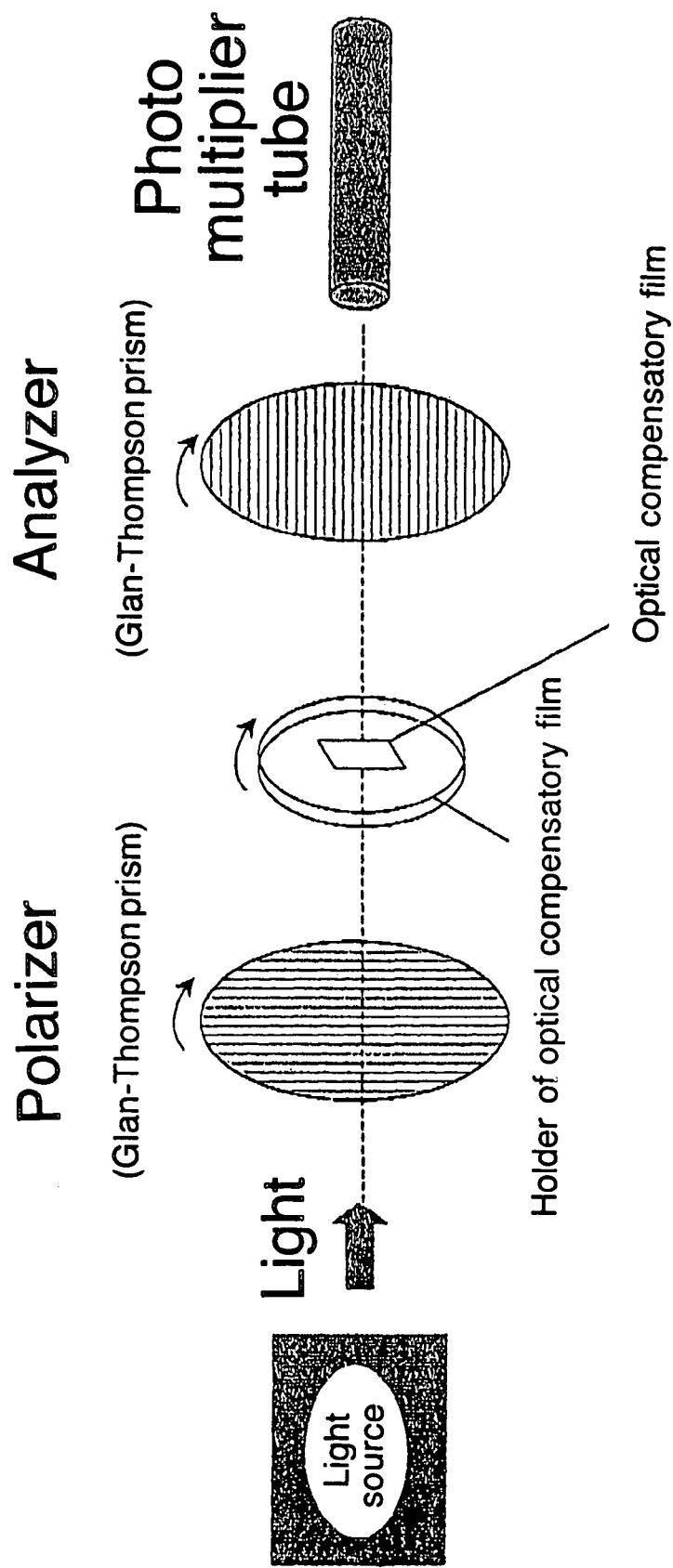
FIG. 6: a sketch schematically illustrating an apparatus for testing an optical compensatory film.
Figure 7:
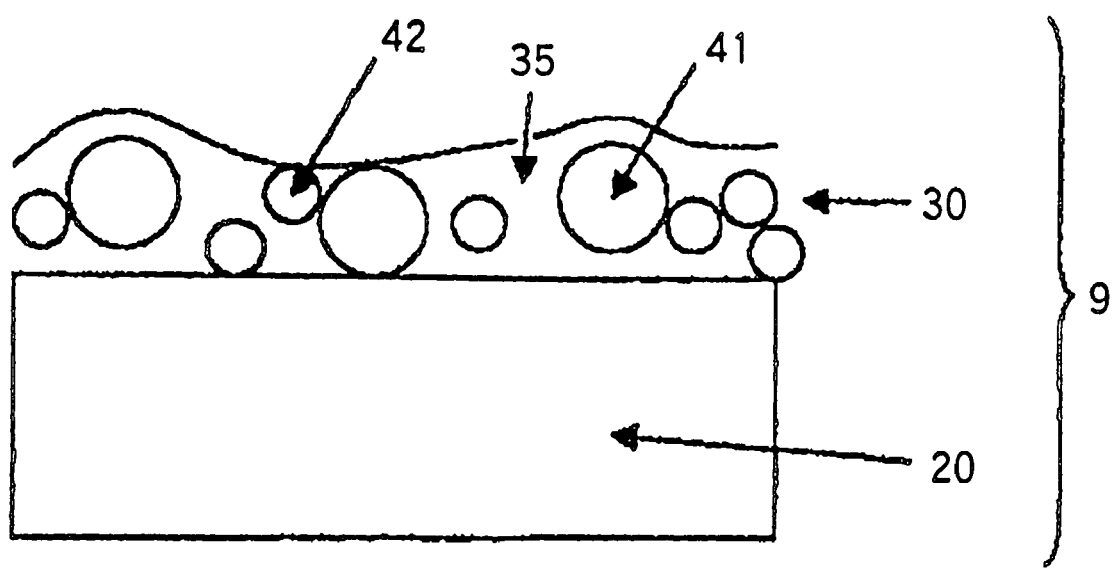
FIG. 7: a sectional view schematically illustrating a representative embodiment of light-diffusing film.

9: light-diffusing film,
10: liquid crystal cell of bend alignment mode
11, 21: liquid crystal compound,
11*a* to 11*j*, 21*a* to 21*j*: rod-like liquid crystal molecules,
12*a*, 12*b*, 22*a*, 22*b*: orientation layer,
13*a*, 13*b*, 23*a*, 23*b*: electrode layer,
14*a*, 24*a*: upper substrate,
14*b*, 24*b*: lower substrate,
20: transparent base film,
30: light-diffusing layer,
31: first optically anisotropic layer,
31*a* to 31*e*: molecules of discotic compound,
32: orientation layer,
33: second optically anisotropic layer,
34: polarizing membrane,
35: transparent resin,
41, 42: transparent fine particles,
NL: normal of disc plane of discotic molecule,
PL: direction obtained by protecting the normal of disc plane onto the second optically anisotropic layer,
RD: rubbing direction,
SA: slow axis in plane,
TA: transmission axis in plane,
BL: backlight, and
a to h: relations of compensation.

The invention claimed is:

1. A liquid crystal display having a liquid crystal cell of bend alignment mode and a pair of polarizing plates provided on both sides of the cell, wherein at least one of the polarizing plates comprises a polarizing membrane and an optical compensatory film positioned nearer to the liquid crystal cell than the polarizing membrane, said optical compensatory film having at least two optically anisotropic layers comprising first and second optically anisotropic layers, said first optically anisotropic layer being made from discotic compounds oriented in hybrid alignment, said second optically anisotropic layer consisting of a cellulose ester film, and said polarizing membrane and said first and second optically anisotropic layers being so placed that the first optically anisotropic layer giving in plane the maximum refractive index in a direction of essentially 45° to a transmission axis in plane of the polarizing membrane, and that the second optically anisotropic layer gives in plane the maximum refractive index in a direction essentially parallel or perpendicular to a transmission axis in plane of the polarizing membrane, and wherein the liquid crystal cell of bend alignment mode and the first and second optically anisotropic layers have optical characteristics satisfying the following formula (1) when measured at any wavelength of 450 nm, 550 nm and 630 nm:

$$0.05 < \Delta n \times d/(Re1 \times Rth2) < 0.20 \qquad (1)$$

in which $\Delta n$ is an inherent birefringent index of rod-like liquid crystal molecules in the liquid crystal cell; d is a thickness of a liquid crystal layer in the liquid crystal cell in terms of nm; Re1 is a retardation value in plane of the first optically anisotropic layer; and Rth2 is a retardation value along a thickness direction of the second optically anisotropic layer, wherein the optical compensatory film gives retardation values Re(0°), Re(40°) and Re(−40°) at 546 nm in the ranges of 30±10 nm, 50±10 nm and 115±10 nm, respectively, and wherein Re(0°), Re(40°) and Re(−40°) stand for retardation values of the optical compensatory film when the retardation is measured, in a plane including the normal of the film and the direction giving in the film plane the minimum refractive index of the optical compensatory film, in the directions inclined at 0°, 40° and reversely 40° from the normal to the plane, respectively, and wherein the first optically anisotropic layer further contains a fluorine-containing polymer in the range of 0.005 to 8 wt. % based on the amount of components of a coating solution other than a solvent.

2. The liquid crystal display as defined in claim 1, wherein the $\Delta n \times d$ satisfies the following formula (2) when measured at any wavelength of 450 nm, 550 nm and 630 nm:

$$100\ nm < \Delta n \times d < 1{,}500\ nm. \qquad (2)$$

3. The liquid crystal display as defined in claim 1, wherein the Re1 satisfies the following formula (3) when measured at any wavelength of 450 nm, 550 nm and 630 nm:

$$10\ nm < Re1 < 50\ nm. \qquad (3)$$

4. The liquid crystal display as defined in claim 1, wherein the Rth2 satisfies the following formula (4) when measured at any wavelength of 450 nm, 550 nm and 630 nm:

$$70\ nm < Rth2 < 400\ nm. \qquad (4)$$

5. The liquid crystal display as defined in claim 1, wherein the direction giving in the film plane the minimum refractive index of the optical compensatory film is essentially at 45° to a longitudinal direction when the optical compensatory film is produced.

6. The liquid crystal display as defined in claim 1, wherein the optical compensatory film and the polarizing membrane are laminated by attaching the film in the form of a roll to the membrane in the form of a roll.

7. A liquid crystal display of reflection type having a reflection board, a liquid crystal cell of hybrid alignment mode and a polarizing plate in order, wherein the polarizing plate comprises a polarizing membrane and an optical compensatory film positioned nearer to the liquid crystal cell than the polarizing membrane, said optical compensatory sheet having at least two optically anisotropic layers comprising first and second optically anisotropic layers, said first optically anisotropic layer being made from discotic compounds oriented in hybrid alignment, said second optically anisotropic layer consisting of a cellulose ester film, and said polarizing membrane and said first and second optically anisotropic layers being so placed that the first optically anisotropic layer gives in plane the maximum refractive index in a direction of essentially 45° to a transmission axis in plane of the polarizing membrane, and that the second optically anisotropic layer gives in plane the maximum refractive index in a direction essentially parallel or perpendicular to a transmission axis in plane of the polarizing membrane, and wherein the liquid crystal cell of hybrid alignment mode and the first and second optically anisotropic layers have optical characteristics satisfying the following formula (5) when measured at any wavelength of 450 nm, 550 nm and 630 nm:

$$0.025 < \Delta n \times d/(Re1 \times Rth2) < 0.10 \qquad (5)$$

in which $\Delta n$ is an inherent birefringent index of rod-like liquid crystal molecules in the liquid crystal cell; d is a thickness of a liquid crystal layer in the liquid crystal cell in terms of nm; Re1 is a retardation value in plane of the first optically anisotropic layer; and Rth2 is a retardation value along a thickness direction of the second optically anisotropic layers, wherein the optical compensatory film gives retardation values Re(0°), Re(40°) and Re(−40°) at 546 nm in the ranges of 30±10 nm, 50±10 nm and 115±10 nm, respectively, wherein Re(0°), Re(40°) and Re(−40°) stand for retardation values of the optical compensatory film when the retardation is measured, in a plane including the normal of the film and the direction giving in the film plane the minimum refractive index of the optical compensatory film, in the directions inclined at 0°, 40° and reversely 40° from the normal to the plane, respectively, and wherein the first optically anisotropic layer further contains a fluorine-containing polymer in the range of 0.005 to 8 wt. % based on the amount of components of a coating solution other than a solvent.

8. The liquid crystal display as defined in claim 7, wherein the $\Delta n \times d$ satisfies the following formula (6) when measured at any wavelength of 450 nm, 550 nm and 630 nm:

$$50\ nm < \Delta n \times d < 750\ nm. \qquad (6)$$

9. The liquid crystal display as defined in claim 7, wherein the Re1 satisfies the following formula (7) when measured at any wavelength of 450 nm, 550 nm and 630 nm:

$$10\ nm < Re1 < 50\ nm. \qquad (7)$$

10. The liquid crystal display as defined in claim 7, wherein the Rth2 satisfies the following formula (8) when measured at any wavelength of 450 nm, 550 nm and 630 nm:

$$70\ nm < Rth2 < 400\ nm. \qquad (8)$$

11. The liquid crystal display as defined in claim 7, wherein the direction giving in the film plane the minimum refractive index of the optical compensatory film is essentially at 45° to a longitudinal direction when the optical compensatory film is produced.

12. The liquid crystal display as defined in claim 7, wherein the optical compensatory film and the polarizing membrane are laminated by attaching the film in the form of a roll to the membrane in the form of a roll.

13. The liquid crystal display as defined in claim 1, wherein the fluorine-containing polymer has a weight average molecular weight of 3,000 to 100,000.

14. The liquid crystal display as defined in claim 1, wherein the fluorine-containing polymer is a copolymer comprising fluorine-containing repeating units and units derived from polyoxyalkylene(meth)acrylate.

15. The liquid crystal display as defined in claim 7, wherein the fluorine-containing polymer has a weight average molecular weight of 3,000 to 100,000.

16. The liquid crystal display as defined in claim 7, wherein the fluorine-containing polymer is a copolymer comprising fluorine-containing repeating units and units derived from polyoxyalkylene(meth)acrylate.

\* \* \* \* \*